United States Patent
Wang et al.

(10) Patent No.: US 11,340,745 B2
(45) Date of Patent: May 24, 2022

(54) TOUCH STRUCTURE AND METHOD FOR MANUFACTURING THE SAME, TOUCH SUBSTRATE AND TOUCH DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yangpeng Wang, Beijing (CN); Benlian Wang, Beijing (CN); Weinan Dai, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/993,384

(22) Filed: Aug. 14, 2020

(65) Prior Publication Data

US 2021/0048925 A1    Feb. 18, 2021

(30) Foreign Application Priority Data

Aug. 15, 2019   (CN) .......................... 201910755780.3

(51) Int. Cl.
*G06F 3/044*   (2006.01)
*G02F 1/1333*   (2006.01)

(52) U.S. Cl.
CPC ........ *G06F 3/0446* (2019.05); *G02F 1/13338* (2013.01); *G06F 3/0443* (2019.05);
(Continued)

(58) Field of Classification Search
CPC ........ G06F 3/044; G06F 3/041; G06F 3/0446; G06F 3/0443; G06F 2203/04103;
(Continued)

(56) References Cited

U.S. PATENT DOCUMENTS

2014/0346027 A1*  11/2014  Li ......................... G06F 3/0443
                                                                  200/600
2015/0062457 A1*  3/2015  Kida ..................... G06F 3/0446
                                                                  349/12

(Continued)

*Primary Examiner* — Amy Onyekaba
(74) *Attorney, Agent, or Firm* — McDermott Will & Emery LLP

(57) ABSTRACT

A touch structure includes an insulating layer, first touch electrodes, second touch electrodes, and dummy electrodes that are insulated from each other. The second touch electrode includes second touch sub-electrodes and bridge portions, and every two adjacent second touch electrodes are electrically connected via a bridge portion. The second touch sub-electrodes and the bridge portions are disposed on two opposite sides of the insulating layer, and the second touch sub-electrodes and the first touch electrodes are disposed on a same side of the insulating layer. The dummy electrodes and the bridge portions are disposed on a same side of the insulating layer. Orthographic projections of the dummy electrodes on the insulating layer do not overlap with orthographic projections of the first touch electrodes and the second touch electrodes on the insulating layer.

17 Claims, 17 Drawing Sheets

(52) U.S. Cl.
CPC .............. *G06F 2203/04103* (2013.01); *G06F 2203/04111* (2013.01)

(58) Field of Classification Search
CPC ......... G06F 2203/04111; G06F 3/0412; G06F 2203/04112; G02F 1/13338
See application file for complete search history.

(56) References Cited

U.S. PATENT DOCUMENTS

| | | | |
|---|---|---|---|
| 2015/0085205 A1* | 3/2015 | Chen | H03K 17/962 200/600 |
| 2015/0241907 A1* | 8/2015 | Tokuno | G06F 3/0446 345/173 |
| 2016/0209952 A1* | 7/2016 | Lin | G06F 3/0446 |
| 2016/0299599 A1* | 10/2016 | Kang | G06F 3/0443 |
| 2016/0378224 A1* | 12/2016 | Kwon | H01L 51/5256 345/174 |
| 2017/0090622 A1* | 3/2017 | Badaye | G06F 3/0448 |
| 2017/0108964 A1* | 4/2017 | Sato | G06F 3/0446 |
| 2017/0147124 A1* | 5/2017 | Li | G06F 3/0446 |
| 2018/0158876 A1* | 6/2018 | Shi | H01L 27/3276 |
| 2018/0237666 A1* | 8/2018 | Xu | C09J 131/04 |
| 2018/0284934 A1* | 10/2018 | Wu | G02F 1/1336 |
| 2019/0064958 A1* | 2/2019 | Liu | G06F 3/0412 |
| 2019/0204975 A1* | 7/2019 | Xie | G06F 3/0412 |
| 2019/0235702 A1* | 8/2019 | Wang | G06F 3/0445 |
| 2019/0265840 A1* | 8/2019 | Kwon | G06F 3/0443 |
| 2020/0117304 A1* | 4/2020 | Lee | G06F 3/0412 |
| 2020/0133435 A1* | 4/2020 | Liu | G06F 3/0443 |
| 2020/0273919 A1* | 8/2020 | Ding | H01L 27/3276 |

* cited by examiner

TOUCH STRUCTURE AND METHOD FOR MANUFACTURING THE SAME, TOUCH SUBSTRATE AND TOUCH DISPLAY DEVICE

CROSS-REFERENCE TO RELATED APPLICATION

This application claims priority to and the benefit of Chinese Patent Application No. 201910755780.3, filed Aug. 15, 2019, which is incorporated herein by reference in its entirety.

TECHNICAL FIELD

The present disclosure relates to the field of display technologies, and in particular, to a touch structure and a method for manufacturing the same, a touch substrate and a touch display device.

BACKGROUND

A capacitive touch screen is a display that uses the conductive touch of a human finger or a specialized device for input. Capacitive touch screens include self-capacitance touch screens and mutual-capacitance touch screens.

SUMMARY

In one aspect, a touch structure is provided. The touch structure includes a plurality of first touch electrodes, a plurality of second touch electrodes, an insulating layer, and a plurality of dummy electrodes. The plurality of first touch electrodes are arranged in a second direction, and each first touch electrode extends along a first direction. The first direction and the second direction intersect. The plurality of second touch electrodes are arranged in the first direction, and each second touch electrode extends along the second direction. At least one second touch electrode includes: a plurality of second touch sub-electrodes and a plurality of bridge portions. The plurality of second touch sub-electrodes are arranged at intervals in the second direction. Every two adjacent second touch sub-electrodes are electrically connected via a corresponding bridge portion. Along a thickness direction of the insulating layer, the plurality of second touch sub-electrodes and the bridge portions are disposed on two sides of the insulating layer, respectively, and the plurality of second touch sub-electrodes and the first touch electrodes are disposed on a same side of the insulating layer. The dummy electrodes, the second touch electrodes and the first touch electrodes are insulated from each other, and the dummy electrodes and the bridge portions are disposed on a same side of the insulating layer. Orthographic projections of the dummy electrodes on the insulating layer do not overlap with orthographic projections of the first touch electrodes and the second touch electrodes on the insulating layer.

In some embodiments, the dummy electrodes and the bridge portions are disposed in a same layer, and are made of a same material.

In some embodiments, the first touch electrodes and the plurality of second touch sub-electrodes are disposed in a same layer, and are made of a same material.

In some embodiments, an orthographic projection of each of the dummy electrodes on the insulating layer is within an area between an orthographic projection of an adjacent one of the first touch electrodes on the insulating layer and an orthographic projection of an adjacent one of the second touch electrodes on the insulating layer.

In some embodiments, at least one first touch electrode includes a plurality of first touch sub-electrodes arranged in the first direction and electrically connected sequentially. At least one of the first touch sub-electrodes and the plurality of second touch sub-electrodes includes at least one first opening. An orthographic projection of a dummy electrode in the dummy electrodes on the insulating layer is within an orthographic projection of a corresponding first opening on the insulating layer.

In some embodiments, a border of the orthographic projection of the dummy electrode on the insulating layer coincides with a border of the orthographic projection of the corresponding first opening on the insulating layer.

In some embodiments, the dummy electrode includes a second opening in the middle of the dummy electrode.

In some embodiments, materials of the first touch electrodes, the second touch electrodes and the dummy electrodes are transparent, and include at least one of metal oxides, metal, conductive inorganic substances, or conductive organic substances.

In some embodiments, materials of the dummy electrodes, the first touch electrodes and the second touch electrodes are the same.

In some embodiments, at least one first touch electrode includes a plurality of first touch sub-electrodes arranged in the first direction and electrically connected sequentially; at least one of the first touch sub-electrodes and the plurality of second touch sub-electrodes has a grid structure.

In some embodiments, the first touch electrodes and the second touch electrodes are made of metal elements or alloys.

In another aspect, a touch substrate is provided. The touch substrate includes a base and the touch structure describe above disposed on the base.

In some embodiments, the touch substrate further includes a protective layer disposed on a side of the touch structure away from the base. A material of the protective layer includes at least one of a silicon oxide, a silicon nitride or a silicon oxynitride.

In yet another aspect, a touch display device is provided. The touch display device includes a display panel and the touch structure described above.

In some embodiments, the touch display panel includes a plurality of sub-pixels, and each sub-pixel has at least one light-emitting region. At least one first touch electrode includes a plurality of first touch sub-electrodes arranged in the first direction and electrically connected sequentially. At least one of the first touch sub-electrodes and the plurality of second touch sub-electrodes includes at least one first opening. An orthographic projection of a light-emitting region on the insulating layer is within an orthographic projection of a corresponding first opening on the insulating layer.

In some embodiments, an orthographic projection of each dummy electrode on the insulating layer is within an orthographic projection of a corresponding first opening on the insulating layer. The dummy electrode includes a second opening located in the middle of the dummy electrode. An orthographic projection of the light-emitting region on the insulating layer is within an orthographic projection of a corresponding second opening on the insulating layer.

In yet another aspect, a method for manufacturing the touch structure described above is provided. The method includes: forming the plurality of first touch electrodes along the second direction; forming a plurality of rows of second touch sub-electrodes along the first direction, second touch sub-electrodes in each row being arranged at intervals along the second direction, and the first direction and the second direction intersecting; forming the insulating layer on the first touch electrodes and the rows of second touch sub-electrodes; forming a plurality of via holes in the insulating layer at positions where the rows of second touch sub-electrodes are to be electrically connected to the plurality of bridge portions; forming the plurality of bridge portions on the insulating layer to electrically connect every two adjacent second touch sub-electrodes arranged in the second direction via corresponding via holes, so as to form the second touch electrodes; forming the plurality of dummy electrodes on areas of the insulating layer where the first touch electrodes and the second touch electrodes do not overlap the insulating layer, the dummy electrodes being insulated from the bridge portions.

In some embodiments, the first touch electrodes and the rows of second touch sub-electrodes are formed through a first patterning process. The bridge portions and the dummy electrodes are formed through a second patterning process.

In yet another aspect, another method for manufacturing the touch structure described above is provided. The method includes: forming the plurality of bridge portions; forming the plurality of dummy electrodes, wherein the dummy electrodes are insulated from the bridge portions; forming an insulating layer on the bridge portions and the dummy electrodes; forming a plurality of via holes in the insulating layer at positions where a plurality of rows of second touch sub-electrodes are to be electrically connected to the bridge portions; forming the plurality of first touch electrodes on the insulating layer along the second direction; and forming the plurality of rows of second touch sub-electrodes along the first direction on areas of the insulating layer where the dummy electrodes and the first touch electrodes do not overlap the insulating layer; second touch sub-electrodes in each row being arranged at intervals along the second direction, and the first direction and the second direction intersecting; and every two adjacent second touch sub-electrodes arranged in the second direction are electrically connected to a corresponding bridge portion via corresponding via holes, so as to form the second touch electrodes.

In some embodiments, the first touch electrodes and the rows of second touch sub-electrodes are formed through a third patterning process. The bridge portions and the dummy electrodes are formed through a fourth patterning process.

BRIEF DESCRIPTION OF THE DRAWINGS

In order to describe technical solutions of the present disclosure more clearly, the accompanying drawings to be used in some embodiments of the present disclosure will be introduced briefly. However, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals that the embodiments of the present disclosure relate to.

DETAILED DESCRIPTION

Figure 1A:
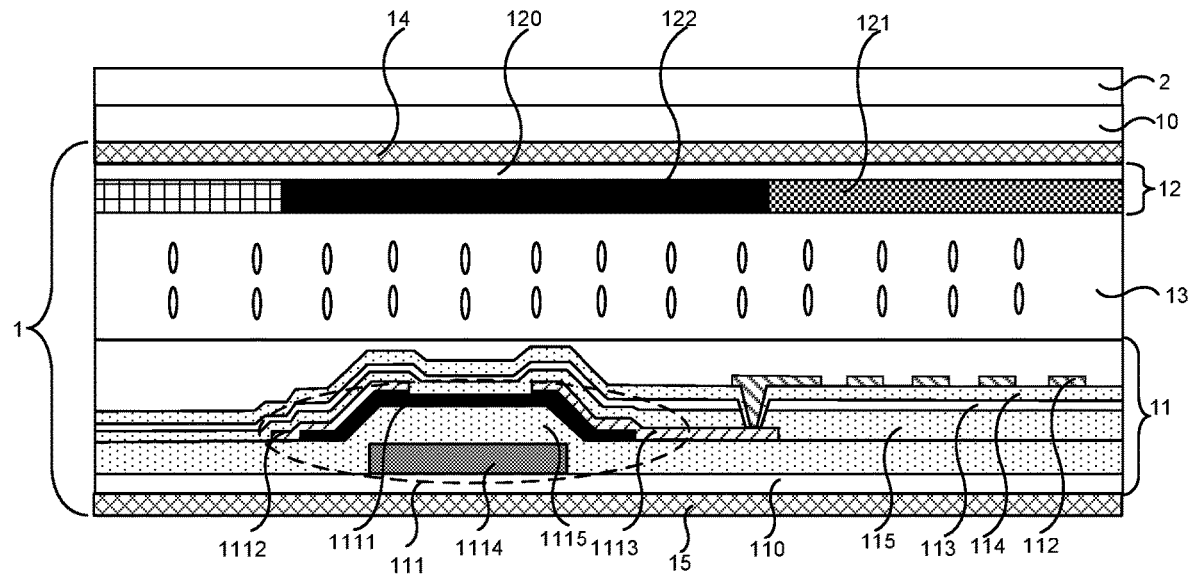
FIG. 1A is a cross-sectional view of a touch display device, according to some embodiments.

Technical solutions in some embodiments of the present disclosure will be described clearly and completely with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Exemplary embodiments are described herein with reference to cross-sectional diagrams and/or plan diagrams as idealized exemplary drawings. In the drawings, thicknesses of layers and regions may be exaggerated for clarity. Therefore, variations in shapes with respect to the drawings due to, for example, manufacturing techniques and/or tolerances are conceivable. Therefore, the exemplary embodiments should not be construed as being limited to the shapes of the regions shown herein, but include shape deviations due to, for example, manufacturing. Therefore, the regions illustrated in the drawings are schematic and their shapes are not intended to illustrate the actual shapes of the regions in an apparatus and are not intended to limit the scope of the exemplary embodiments.

Unless the context requires otherwise, throughout the description and claims, the term "comprise" and other forms thereof such as the third-person singular form "comprises" and the present participle form "comprising" are construed as an open and inclusive meaning, i.e., "inclusive, but not limited to". In the description, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials or characteristics may be included in any one or more embodiments or examples in any suitable manner.

Terms such as "first" and "second" are used for descriptive purposes only and are not to be construed as indicating or implying the relative importance or implicitly indicating the number of indicated technical features below. Therefore, features defined by the term "first" or "second" may include one or more of the features, either explicitly or implicitly. In the description of the embodiments of the present disclosure, the term "plurality of" means two or more unless otherwise specified.

In the description of some embodiments, the terms "connected" and the like should be broadly understood unless expressly stated and limited otherwise. For example, they can be construed as fixedly connected or detachably connected or integrally connected. They can be mechanically connected or electrically connected and can be directly connected or indirectly connected through an intermediate medium. There can also be an internal connection between two elements. A person of ordinary skill in the art would understand the specific meaning of the terms in specific situations.

It will also be understood that when a layer or element is referred to as being "on" another layer or substrate, it can be directly on the other layer or substrate, or intervening layers may also be present.

"About", "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Some embodiments of the present disclosure provide a touch display device. The touch display device may be a liquid crystal display (LCD) device having a touch function. The touch display device may also be an electroluminescent display device having the touch function or a photoluminescent display device having the touch function. For example, the electroluminescent display device may be an organic light-emitting diode (OLED) display device or a quantum dot light-emitting diode (QLED) display device. For example, the photoluminescent display device is a quantum dot photoluminescent display device.

Figure 1B:
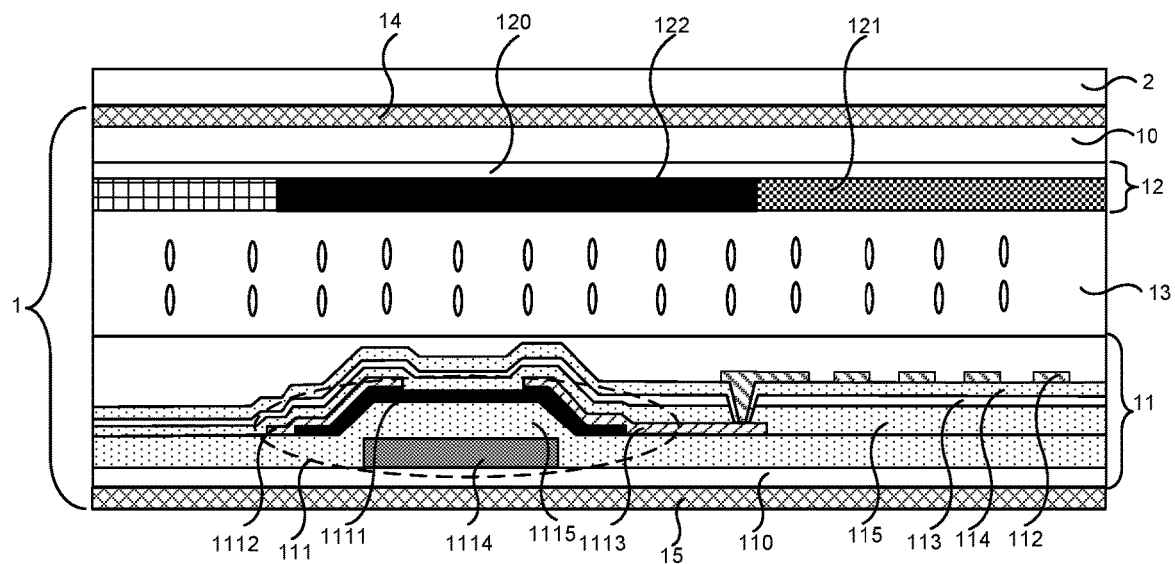
FIG. 1B is a cross-sectional view of another touch display device, according to some embodiments.
Figure 1C:
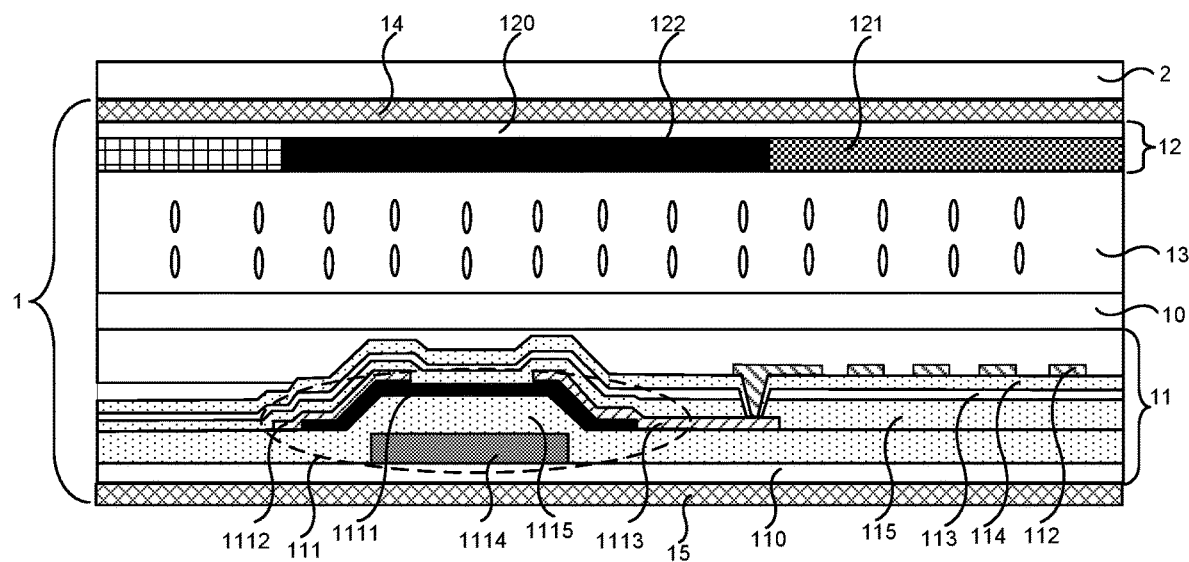
FIG. 1C is a cross-sectional view of yet another touch display device, according to some embodiments.

In some embodiments, the touch display device is the LCD device with the touch function. As shown in FIGS. 1A, 1B and 1C, the touch display device includes a cover sheet 2, a touch structure 10, a liquid crystal display panel 1, and a backlight module. The backlight module is configured to provide light for the liquid crystal display panel to display images.

As shown in FIGS. 1A, 1B and 1C, the liquid crystal display panel 1 includes an array substrate 11, an opposite substrate 12, and a liquid crystal layer 13 that is disposed between the array substrate 11 and the opposite substrate 12.

Figure 1D:
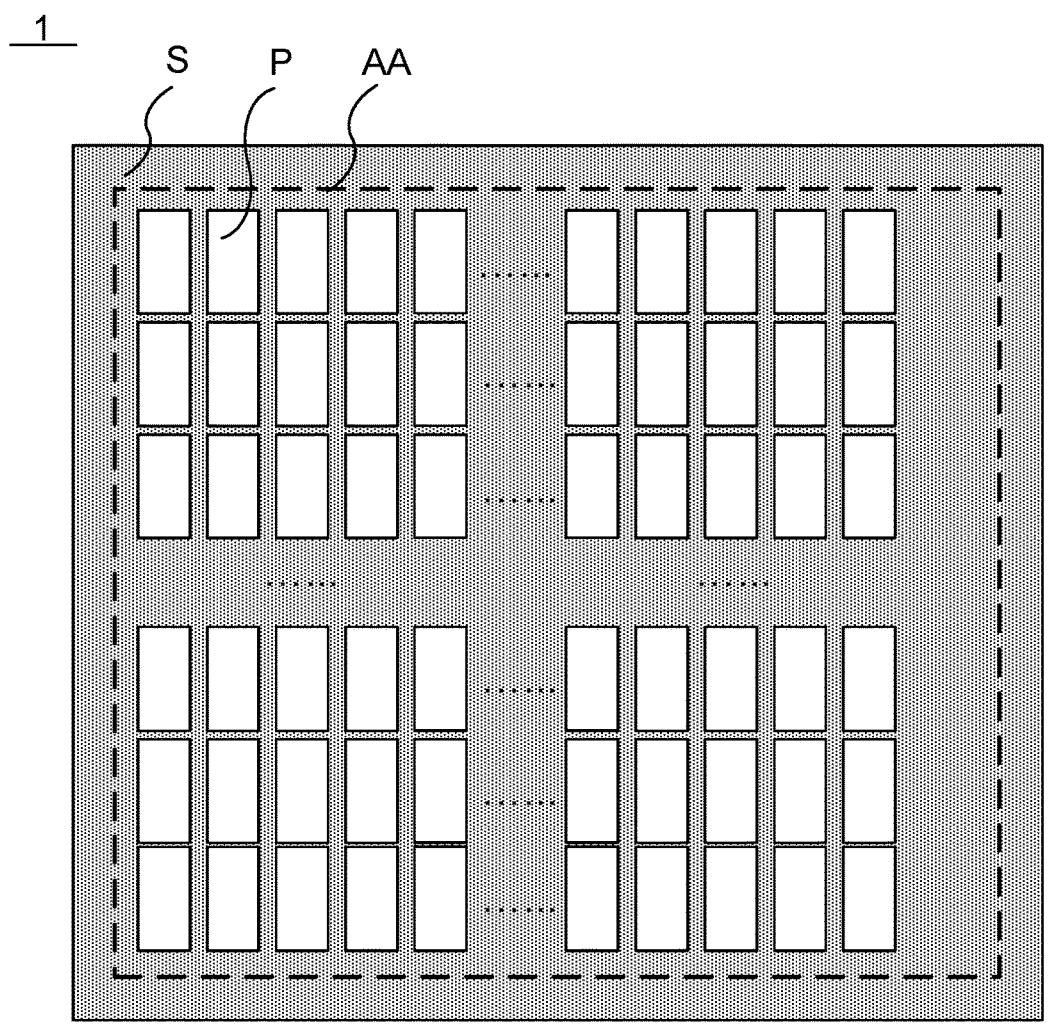
FIG. 1D is a top view of a display panel, according to some embodiments.

As shown in FIG. 1D, the liquid crystal display panel 1 has an active area AA and a peripheral region S. The peripheral region S is arranged on at least one side of the active area AA. For example, the peripheral region S may be arranged around the active area AA. Alternatively, the peripheral region S may be arranged on one side or two opposite sides of the active area AA.

The liquid crystal display panel 1 includes a plurality of sub-pixels P disposed in the active area AA, and a region where a sub-pixel P is located may be called a sub-pixel region. The sub-pixel P includes a pixel electrode and at least one thin film transistor.

The liquid crystal display panel 1 may further include a plurality of wires or lines disposed in the peripheral region S, and the wires or lines are electrically connected to the sub-pixels P in the active area AA. For example, the wires or lines include leads connected to gate lines in the active area AA, leads connected to data lines in the active area AA, a lead connected to a common electrode in the active area AA, and power lines. The liquid crystal display panel 1 may further include a plurality of bonding electrodes or at least one driver circuit (e.g., a gate driver circuit) disposed in the peripheral region S.

In some embodiments, as shown in FIGS. 1A, 1B and 1C, the array substrate 11 includes a first base 110, and the pixel electrodes 112 and the thin film transistors 111 disposed on the first base 110. A pixel electrode 112 and at least one thin film transistor 111 are disposed in a sub-pixel region. The thin film transistor 111 includes a gate 1114, a portion of a gate insulating layer 1115, an active pattern 1111, a source 1112, and a drain 1113. The gate 1114, the gate insulating layer 1115 and the active pattern 1111 are disposed on the first base 110 along a direction away from the first base 110. The source 1112 and the drain 1113 are disposed on the active pattern 1111 and are in contact with two opposite ends of the active pattern 1111, respectively. The drain 1113 is electrically connected to the pixel electrode 112, and the source 1112 is electrically connected to a corresponding date line. It will be understood that, in some other embodiments, the source 1112 is electrically connected to the pixel electrode 112, and the drain 1113 is electrically connected to the corresponding date line.

The thin film transistor 111 may be a bottom-gate thin film transistor, a top-gate thin film transistor, or a dual-gate thin film transistor. The thin film transistors 111 in FIGS. 1A, 1B and 1C are illustrated by an example where they are the bottom-gate thin film transistors.

In some embodiments, as shown in FIGS. 1A, 1B and 1C, the array substrate 11 further includes a common electrode 113 disposed on the first base 110. The pixel electrode 112 and the common electrode 113 may be disposed in a same layer. In this case, the pixel electrode 112 and the common electrode 113 both have comb structures including a plurality of strip-shaped sub-electrodes.

It is also possible that the pixel electrode 112 and the common electrode 113 are disposed in different layers. In this case, as shown in FIGS. 1A, 1B and 1C, the array substrate 11 further includes a first insulating layer 114 disposed between the pixel electrode 112 and the common electrode 113. For example, the common electrode 113 is disposed between the thin film transistor 111 and the pixel electrode 112, and as shown in FIGS. 1A, 1B and 1C, the array substrate 11 further includes a second insulating layer 115 disposed between the common electrode 113 and the thin film transistor 111. It will be understood that there are via holes passing through the first insulating layer 114 and the second insulating layer 115, so that the pixel electrode 112 can be electrically connected to the drain 1113 or the source 1112 of the thin film transistor 111 via the via holes.

In some other embodiments, the common electrode 113 is included in the opposite substrate 12.

In some embodiments, as shown in FIGS. 1A, 1B and 1C, the opposite substrate 12 further includes a second base 120 and a color filter layer 121 disposed on the second base 120. In this case, the opposite substrate 12 may be called a color filter (CF) substrate. The color filter layer 121 includes at least a plurality of first color filter units, a plurality of second color filter units, and a plurality of third color filter units. The first color filter units, the second color filter units and the third color filter units are each disposed in a corresponding sub-pixel region. The first color, the second color and the third color may be three primary colors, such as red, green and blue, respectively.

The opposite substrate 12 further includes a black matrix 122 disposed on the second base 120, and the black matrix 122 is disposed between any two adjacent color filter units. The black matrix 122 can make the two adjacent color filter units be spaced apart.

As shown in FIGS. 1A, 1B and 1C, the liquid crystal display panel 1 further includes a first polarizer 14 and a second polarizer 15. The first polarizer 14 is disposed on a side of the opposite substrate 12 away from the liquid crystal layer 13, and the second polarizer 15 is disposed on a side of the array substrate 11 away from the liquid crystal layer 13.

In some embodiments, the touch structure 10 is disposed on a side of the first base 110 away from the opposite substrate 12.

In some other embodiments, the touch structure 10 is disposed on a side of the second base 120 away from the array substrate 11.

In some example, as shown in FIG. 1A, the touch structure 10 is disposed on a light exit side of the liquid crystal display panel 1. The touch structure 10 may be disposed between the cover sheet 2 (e.g., a cover glass) and the first polarizer 14. For example, the touch structure 10 is disposed directly on a surface of the cover sheet 2 facing the array substrate 11.

In some other example, as shown in FIG. 1B, the touch structure 10 is disposed between the first polarizer 14 and the opposite substrate 12. For example, the touch structure 10 is disposed directly on a surface of the second base 120 facing away from the array substrate 11.

In some other examples, as shown in FIG. 1C, the touch structure 10 is disposed between the first base 110 and the second base 120. For example, the touch structure 10 is disposed between the liquid crystal layer 13 and the array substrate 11.

Figure 2A:
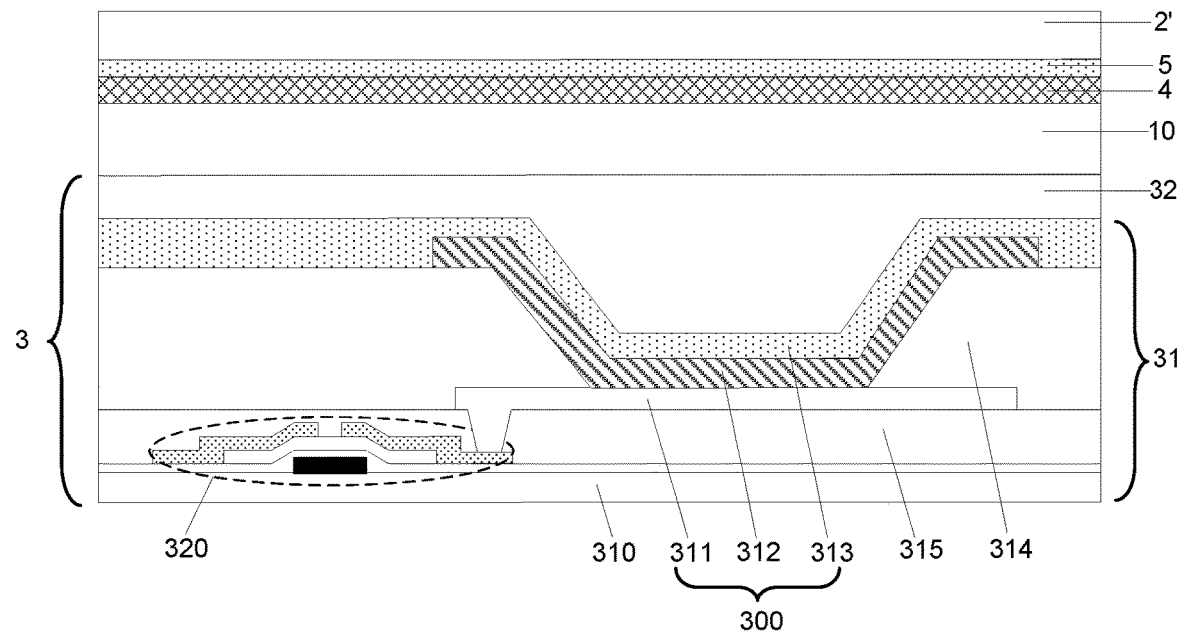
FIG. 2A is a cross-sectional view of yet another touch display device, according to some embodiments.
Figure 2B:
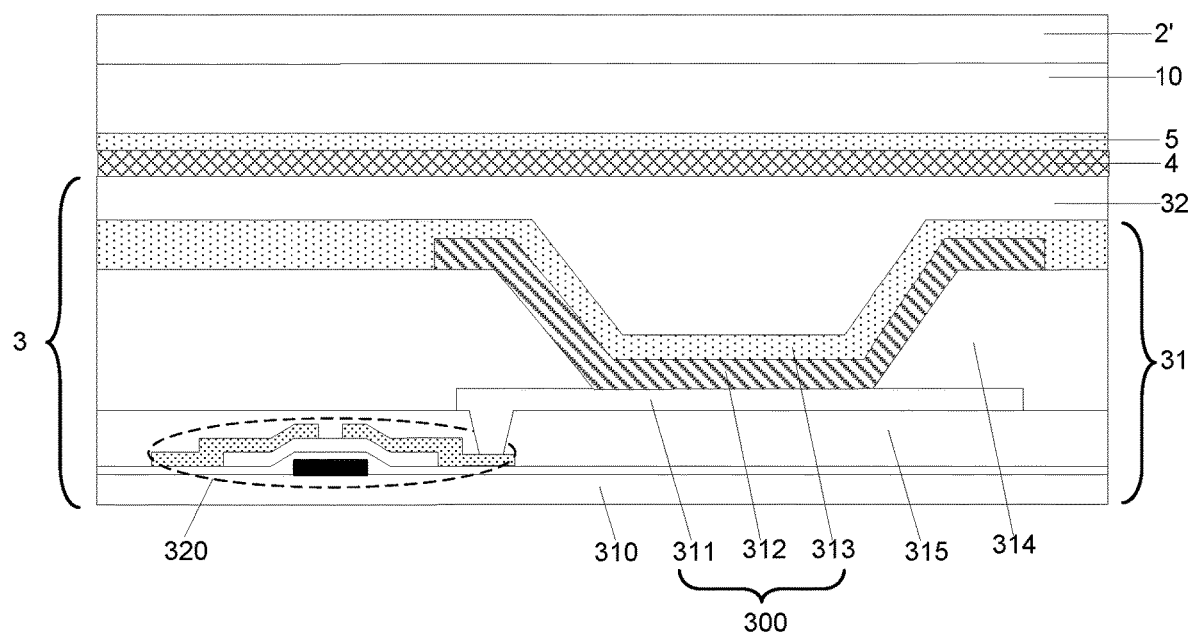
FIG. 2B is a cross-sectional view of yet another touch display device, according to some embodiments.

In some embodiments, the touch display device is the electroluminescent display device having the touch function, and as shown in FIGS. 2A and 2B, the touch display device includes an electroluminescent display panel 3, a touch structure 10, a third polarizer 4, a first optically clear adhesive (OCA) 5 and a cover sheet 2' (e.g., a cover glass).

The electroluminescent display panel 3 includes a display substrate 31, and an encapsulation structure 32 that is used for encapsulating the display substrate 31. For example, the encapsulation structure 32 may prevent water and oxygen from entering the display substrate 31. The encapsulation structure 32 may be an encapsulation film, or a laminated structure composed of multiple films.

In some embodiments, as shown in FIGS. 2A and 2B, the display substrate 31 includes a third base 310, and light-emitting devices 300 and pixel driver circuits that are disposed on the third base 310. A light-emitting device 300 and a pixel driver circuit are disposed in a sub-pixel region.

The pixel driver circuit includes a plurality of transistors. For examples, the transistors includes a driving transistor 320 and at least one switching transistor. The driving transistor 320 is configured to provide a driving current to the light-emitting device 300 to drive the light-emitting device 300 to emit light. It will be understood that, a width-to-length ratio of a channel of the active pattern in the driving transistor 320 is greater than that in the switching transistor.

As shown in FIGS. 2A and 2B, in some embodiments, the display substrate 31 further includes a pixel defining layer 314. The pixel defining layer 314 includes a plurality of openings, and each opening is located in a corresponding sub-pixel region. Each light-emitting device 300 corresponds to a respective one of the plurality of openings.

The light-emitting device 300 includes a first electrode 311, a light-emitting functional layer 312 and a second electrode 313. The first electrode 311 may be an anode, and the second electrode 313 may be a cathode; or, the first electrode 311 may be a cathode, and the second electrode 313 may be an anode. The first electrode 311 is electrically connected to a drain or a source of the driving transistor 320.

In some embodiments, the light-emitting functional layer 312 includes a light-emitting layer. Besides the light-emitting layer, the light-emitting functional layer 312 may further include at least one of an election transporting layer (ETL), an electron injection layer (EIL), a hole transporting layer (HTL), or a hole injection layer (HIL). For example, the light-emitting functional layer 312 may have a laminated structure composed of the election transporting layer, the electron injection layer, the light-emitting layer, the hole transporting layer and the hole injection layer that are stacked.

In some examples, the light-emitting layer is an organic light-emitting layer. In this case, the light-emitting device 300 is an organic light-emitting diode. In some other examples, the light-emitting layer is a quantum dot layer. In this case, the light-emitting device 300 is a quantum dot light-emitting diode.

The light-emitting device 300 may be a bottom-emission light-emitting device, a top-emission light-emitting device, or a double-sided emission light-emitting device.

In an example where the light-emitting device is the top-emission light-emitting device, the light emitted by the light-emitting device exits from the light-emitting device at a side thereof away from the third base 310. The first electrode 311 may be an anode, and in this case, the first electrode 311 may be opaque. For example, the first electrode 311 has a laminated structure composed of an indium tin oxide (ITO) layer, a silver (Ag) layer, and another ITO layer (i.e., an ITO-Ag-ITO laminated structure), so as to reflect light incident on the first electrode 311 to a side of the first electrode 311 away from the third base 310, thereby improving the light extraction efficiency of the electroluminescent display panel 3. Correspondingly, the second electrode 313 may be a cathode, and in this case, the second electrode 313 is transparent or translucent. For example, the second electrode 313 is a silver layer that is thin enough to be transparent or translucent, so as to allow the light emitted from the light-emitting layer to pass through.

As shown in FIGS. 2A and 2B, the display substrate 31 further includes a planarization layer 315 disposed between the pixel driver circuit and the first electrode 311. The planarization layer 315 provides a relatively flat surface for forming the first electrode 311 thereon.

In some embodiments, the touch structure 10 is disposed on a light exit side of the electroluminescent display panel 3. In some examples, as shown in FIG. 2A, the touch structure 10 is directly disposed on a surface of the encapsulation structure 32 facing away from the third base 310. In other words, no other film layer is disposed between the touch structure 10 and the encapsulation structure 32. In some other examples, as shown in FIG. 2B, the touch structure 10 is disposed between the cover sheet 2' and the third polarizer 4. For example, the touch structure 10 is disposed on a surface of the cover sheet 2' approximate to the third polarizer 4.

The electroluminescent display device is self-luminous, so that no backlight module is required. In a case where the touch display device is the electroluminescent display device, the touch display device may be a flexible display device without a backlight module.

Figure 2C:
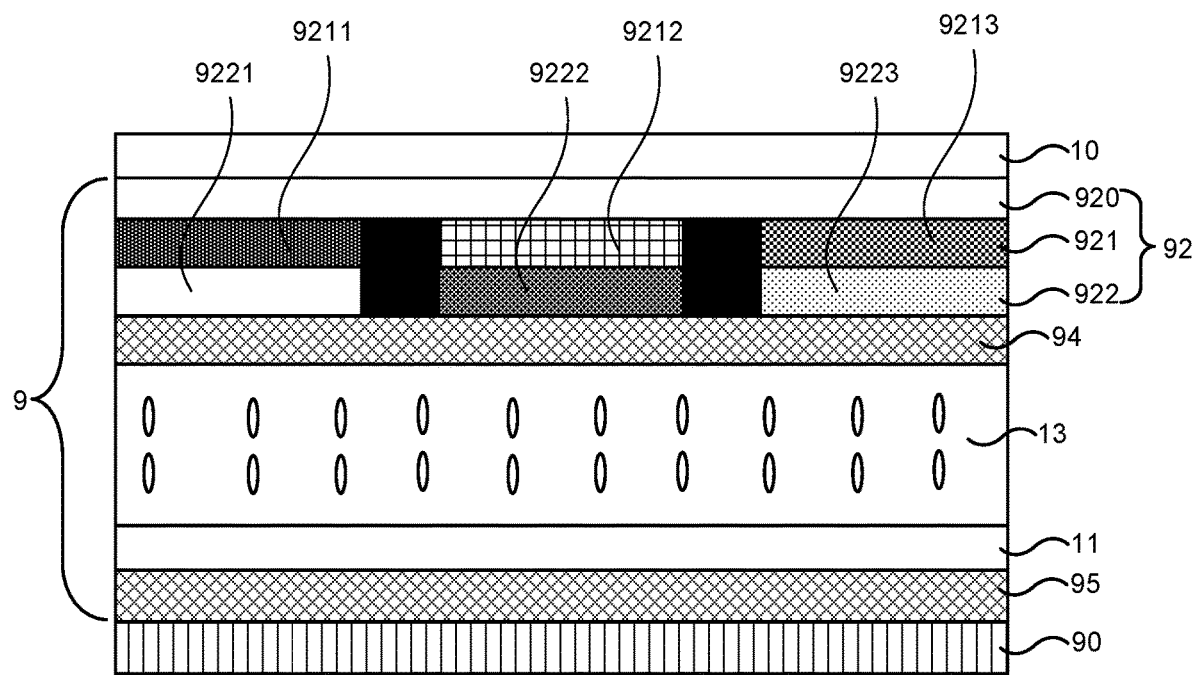
FIG. 2C is a cross-sectional view of yet another touch display device, according to some embodiments.
Figure 2D:
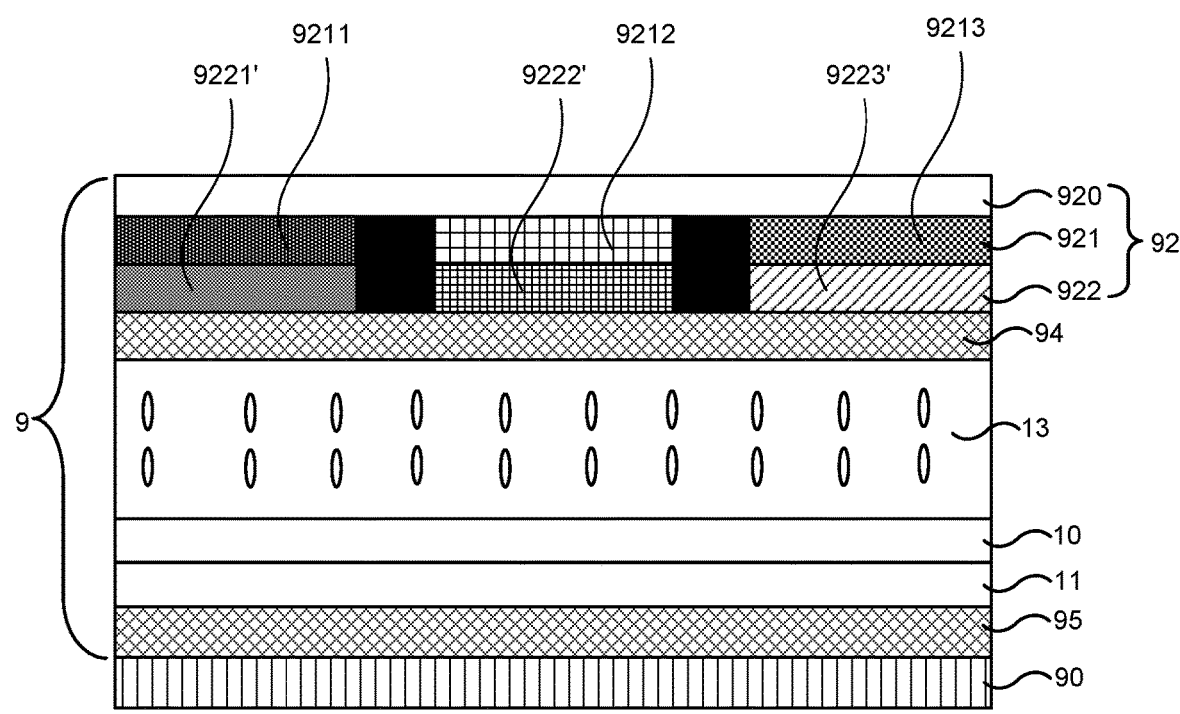
FIG. 2D is a cross-sectional view of yet another touch display device, according to some embodiments.

In some embodiments, the touch display device is the photoluminescent display device having the touch function, and as shown in FIGS. 2C and 2D, the touch display device includes a touch structure 10, a photoluminescent display panel 9 and a backlight module 90.

In some embodiments, as shown in FIGS. 2C and 2D, the photoluminescent display panel 9 includes an array substrate 11, a quantum dot color filter substrate 92, and a liquid crystal layer 13 disposed between the array substrate 11 and the quantum dot color filter substrate 92.

The array substrate 11 in the photoluminescent display device has the same structure as the array substrate 11 in the foregoing liquid crystal display device. For example, the array substrate 11 includes a first base 110, and a plurality of thin film transistors 111 and a plurality of pixel electrodes 112 that are disposed on the first base 110. Details will not be elaborated here again.

As shown in FIGS. 2C and 2D, the quantum dot color filter substrate 92 includes a fourth base 920 and a photoluminescent layer 922 disposed on the fourth base 920.

In some examples, as shown in FIG. 2C, the backlight module 90 is configured to provide blue light to the photoluminescent display panel 9. In this case, the photoluminescent layer 922 includes a plurality of transparent patterns 9221, a plurality of first light conversion patterns 9222 and a plurality of second light conversion patterns 9223. The transparent pattern 9221 is configured to allow the blue light to pass through directly. The first light conversion pattern 9222 is configured to convert the blue light into first color light, and the second light conversion pattern 9223 is configured to convert the blue light into second color light. The first color light and the second color light are, for example, red light and green light, respectively. In some examples, the first light conversion pattern 9222 includes a first quantum dot material, and the second light conversion pattern 9223 includes a second quantum dot material.

In some other examples, as shown in FIG. 2C, the backlight module 90 is configured to provide violet light or UV light to the photoluminescent display panel 9. In this case, the photoluminescent layer 922 includes a plurality of first light conversion patterns 9222', a plurality of second light conversion patterns 9223' and a plurality of third light conversion patterns 9221'. The first light conversion pattern 9222' is configured to convert the light provided by the backlight module 90 into first color light, the second light conversion pattern 9223' is configured to convert the light provided by the backlight module 90 into second color light, and the third light conversion pattern 9221' is configured to convert the light provided by the backlight module 90 into third color light. The first color light, the second color light, and the third color light may be light of three primary colors. In some examples, the first light conversion pattern 9222' includes a first quantum dot material, the second light conversion pattern 9223' includes a second quantum dot material, and the third light conversion pattern 9221' includes a third quantum dot material.

In some embodiments, as shown in FIGS. 2C and 2D, the quantum dot color filter substrate 92 further includes a filter layer 921 disposed between the fourth base 920 and the photoluminescent layer 922. The filter layer 921 includes at least a plurality of first color filter units 9212, a plurality of second color filter units 9213 and a plurality of third color filter units 9211.

In some examples, as shown in FIG. 2C, orthographic projections of each first color filter unit 9212 and a corresponding first light conversion pattern 9222 on the fourth base 920 overlap, and the first color filter unit 9212 is configured to transmit the first color light and absorb other color light (i.e., the second color light and the blue light); orthographic projections of each second color filter unit 9213 and a corresponding second light conversion pattern 9223 on the fourth base 920 overlap, and the second color filter unit 9213 is configured to transmit the second color light and absorb other color light (i.e., the first color light and the blue light); and orthographic projections of each third color filter unit 9211 and a corresponding transparent pattern 9221 on the fourth base 920 overlap, and the third color filter unit 9211 is configured to transmit the blue light and absorb other color light (the first color light and the second color light). For example, the first color and the second color are red and green from the primary colors, respectively.

In some other examples, as shown in FIG. 2D, orthographic projections of each first color filter unit 9212 and a corresponding first light conversion pattern 9222' on the fourth base 920 overlap, and the first color filter unit 9212 is configured to transmit the first color light and absorb other color light (i.e., the second color light and the third color light); orthographic projections of each second color filter unit 9213 and a corresponding second light conversion pattern 9223' on the fourth base 920 overlap, and the second color filter unit 9213 is configured to transmit the second color light and absorb other color light (i.e., the first color light and the third color light); and orthographic projections of each third color filter unit 9211 and a corresponding third light conversion pattern 9221' on the fourth base 920 overlap, and the third color filter unit 9211 is configured to transmit the third color light and absorb other color light (i.e., the first color light and the second color light). For example, the first color, the second color and the third color are the three primary colors.

As shown in FIGS. 2C and 2D, the photoluminescent display panel 9 further includes a fourth polarizer 94 disposed between the liquid crystal layer 13 and the photoluminescent layer 922, and a fifth polarizer 95 disposed between the array substrate 11 and the backlight module 90.

In some embodiments, the touch structure 10 is disposed on a light exit side of the photoluminescent display panel 9. For example, as shown in FIG. 2C, the touch structure 10 is disposed directly on a surface of the fourth base 920 facing away from the liquid crystal layer 13.

In some other embodiments, as shown in FIG. 2D, the touch structure 10 is disposed between the fourth base 920 and the array substrate 11.

The touch structure 10 in any one of the above touch display devices in some embodiments of the present disclosure will be described below with reference to the accompanying drawings.

In some embodiments, as shown in FIGS. 4A to 6B, the touch structure 10 includes a plurality of first touch electrodes 101, a plurality of second touch electrodes 102, an insulating layer 103 and a plurality of dummy electrodes 104. The first touch electrodes 101, the second touch electrodes 102 and the dummy electrodes 104 are insulated from each other.

The first touch electrodes 101 are arranged in a second direction OX, and each first touch electrode 101 extends along a first direction OY. The first direction OY and the second direction OX intersect. For example, the first direction OY and the second direction OX are substantially perpendicular. The second touch electrodes 102 are arranged in the first direction OY, and each second touch electrode 102 extends along the second direction OX.

The second touch electrode 102 includes a plurality of second touch sub-electrodes 1021 and a plurality of bridge portions 1022. The plurality of second touch sub-electrodes 1021 are arranged at intervals along the second direction OX, and every two adjacent second touch sub-electrodes 1021 are electrically connected via a corresponding bridge portion 1022.

Along a thickness direction of the insulating layer 103, the plurality of second touch sub-electrodes 1021 and the bridge portions 1022 are disposed on two sides of the insulating layer 103, respectively, and the plurality of second touch sub-electrodes 1021 and the first touch electrodes 101 are disposed on a same side of the insulating layer 103.

The dummy electrodes 104 and the bridge portions 1022 are disposed on a same side of the insulating layer 103. Orthographic projections of the dummy electrodes 104 on the insulating layer 102 do not overlap with orthographic projections of the first touch electrodes 101 and second touch electrodes 102 on the insulating layer 103.

Figure 3A:
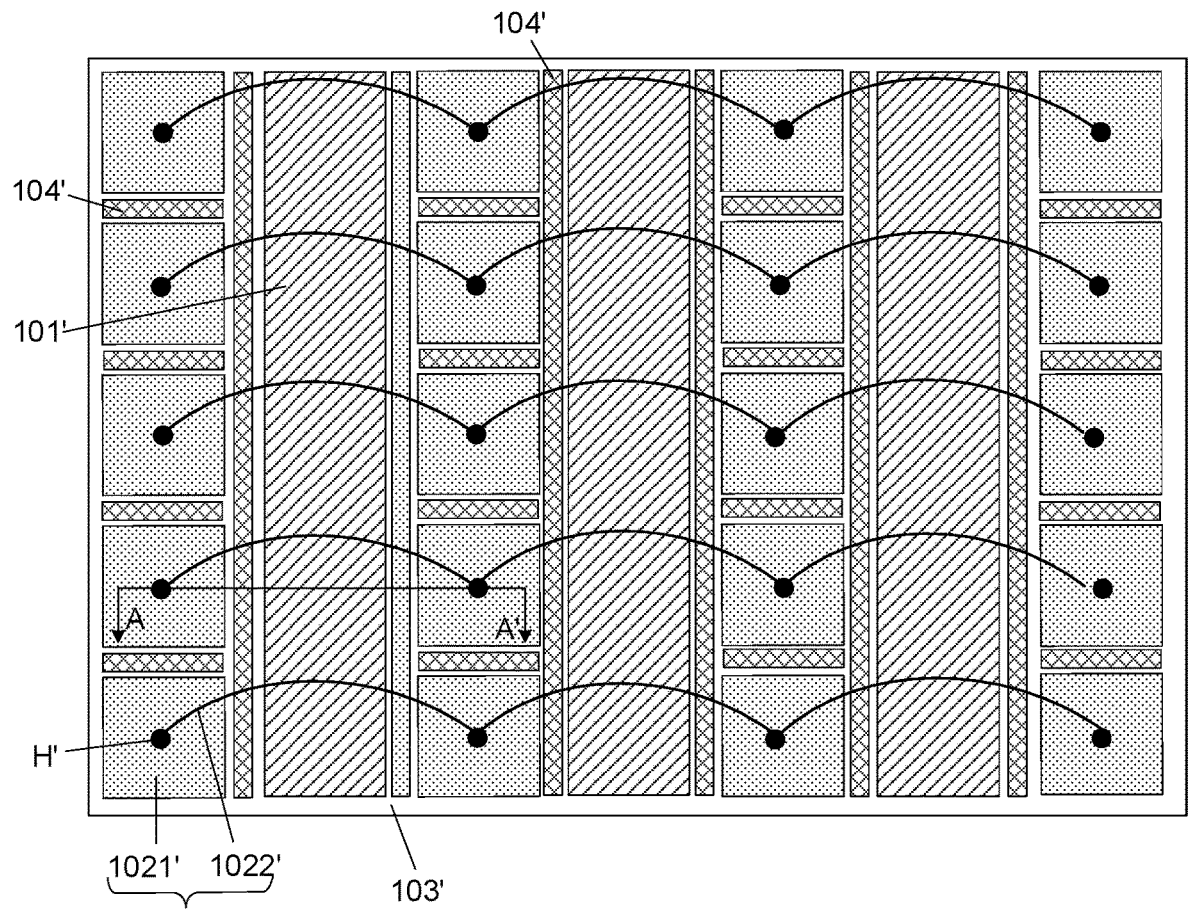
FIG. 3A is a schematic diagram of a touch structure in a mutual-capacitance touch screen.
Figure 3B:
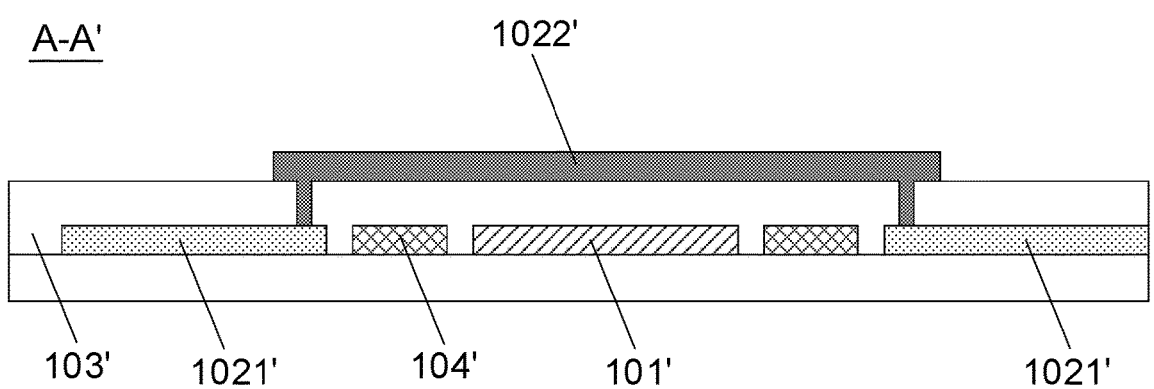
FIG. 3B is a cross-sectional view of the touch structure in FIG. 3A taken along the line A-A'.

In another touch structure, as shown in FIGS. 3A and 3B, a plurality of first touch electrodes 101', a plurality of second touch sub-electrodes 1021' and a plurality of dummy electrodes 104' are disposed on a same side of the insulating layer 103', and the plurality of bridge portions 1022' are disposed on an opposite side of the insulating layer 103. Since the first touch electrodes 101', the second touch sub-electrodes 1021', and the dummy electrodes 104' are disposed on the same side of the insulating layer 103, and there is limited place for arrangement, the first touch electrodes 101', the second touch sub-electrodes 1021' and the dummy electrodes 104' are relatively close to each other. In other words, distributions of the first touch electrodes 101', the second touch sub-electrodes 1021' and the dummy electrodes 104' are relatively dense. As a result, folding property and folding performance of the touch structure 10 may be poor. In addition, when the touch structure 10 is folded, the stresses on both sides of the insulating layer 103 along its thickness direction are different, which may cause problems such as breakage or delamination of the touch structure 10. As a result, the reliability of the touch structure 10 may be reduced.

However, in the touch structure 10 provided by some embodiments of the present disclosure, the plurality of second touch sub-electrodes 1021 and the plurality of bridge portions 1022 are provided on two sides of the insulating layer 103 along the thickness direction, respectively, the plurality of second touch sub-electrodes 1021 and the plurality of first touch electrodes 101 are provided on the same side of the insulating layer 103, and the plurality of dummy electrodes 104 and the plurality of bridge portions 1022 are provided on the opposite side of the insulating layer 103. That is, unlike the plurality of first touch electrodes 101 and the plurality of second touch sub-electrodes 1021, the plurality of dummy electrodes 104 are disposed on a different side of the insulating layer 103, and thus the touch structure 10 may balance the stresses on both sides of the insulating layer 103 along the thickness direction, which may reduce the risk of problems such as breakage and falling off of the touch structure 10. Therefore, the folding property and folding performance of the touch structure 10 may be improved on a premise of shadow elimination, and the reliability of the touch structure 10 may be improved.

It will be understood that FIGS. 4A to 6B show an example in which the plurality of second touch sub-electrodes 1021 are disposed above the plurality of bridge portions 1022, but it is also possible that the plurality of bridge portions 1022 are disposed above the plurality of second touch sub-electrodes 1021.

It will be understood that the insulating layer 103 is provided with a plurality of via holes, so that the second touch sub-electrode 1021 can be electrically connected to a corresponding bridge portion 1022 via a corresponding via hole.

It will be noted that, the touch structure 10 is a mutual-capacitance touch structure, and the principle of the mutual-capacitance touch structure to realize touch is as follows. In a region where the orthographic projections of the first touch electrode 101 and the second touch electrodes 102 on the insulating layer 103 overlap (shown as the dotted circle in FIG. 4A), a coupling capacitor is formed, and in this region, a portion of the first touch electrode 101 and a portion of the second touch electrode 102 opposite to each other are electrodes of the coupling capacitor. When a finger touches the touch structure 10, a coupling between the first touch electrode 101 and the second touch electrode 102 near the touch point is affected, thereby changing a capacitance value of the coupling capacitor. For example, excitation signals are sequentially sent to the first touch electrodes 101, and sensing signals are received from the second touch electrodes 102, so that a plurality of capacitance values each between a first touch electrode 101 and a corresponding second touch electrode 102 can be acquired. If the capacitance value between a first touch electrode 101 and a corresponding second touch electrode 102 changes, according to the change of the capacitance value, the coordinates of the touch point can be calculated by a processor of the touch display device.

In some examples, the first touch electrode 101 is a driving electrode, and the second touch electrode 102 is a sensing electrode. In some other examples, the first touch electrode 101 is the sensing electrode, and the second touch electrode 102 is the driving electrode. The driving electrode refers to an electrode that is configured to receive a low voltage and high frequency signal from a driver circuit, and the sensing electrode refers to an electrode that is configured to generate a current. When there is no touch on the touch display device, the current on sensing electrode has a steady value. However, when there is a touch on the touch display device, the value of the current changes since the touch changes the capacitance between the driving electrode and the sensing electrode.

Figure 4A:
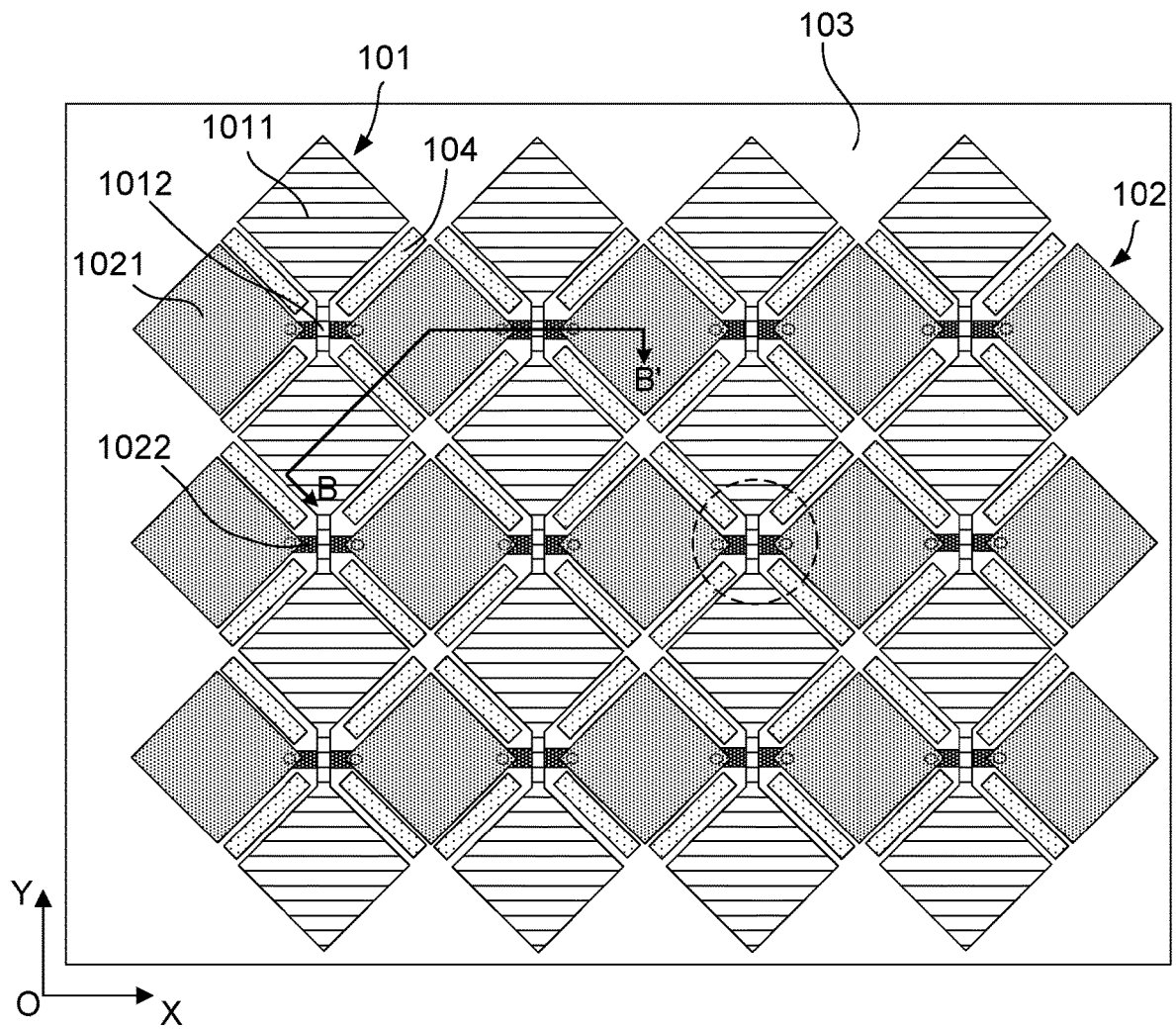
FIG. 4A is a top view of a touch structure, according to some embodiments.
Figure 4B:
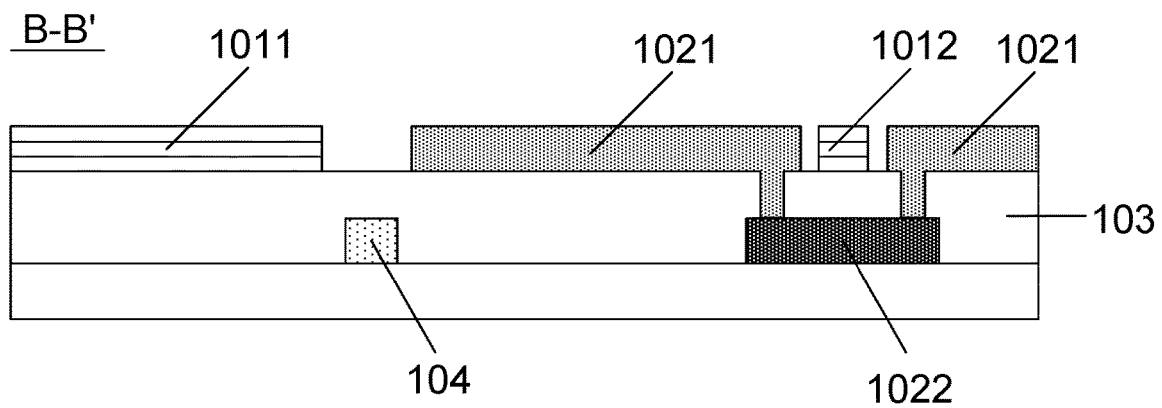
FIG. 4B is a cross-sectional view of the touch structure in FIG. 4A taken along the line B-B', according to some embodiments.

In some embodiments, as shown in FIG. 4B, the plurality of dummy electrodes 104 and the plurality of bridge portions 1022 are disposed in a same layer, and are made of a same material. In this way, the plurality of dummy electrodes 104 and the plurality of bridge portions 1022 may be formed through a same patterning process (e.g., a second patterning process) with a same mask, which may simplify the process of manufacturing the touch structure 10.

Figure 5A:
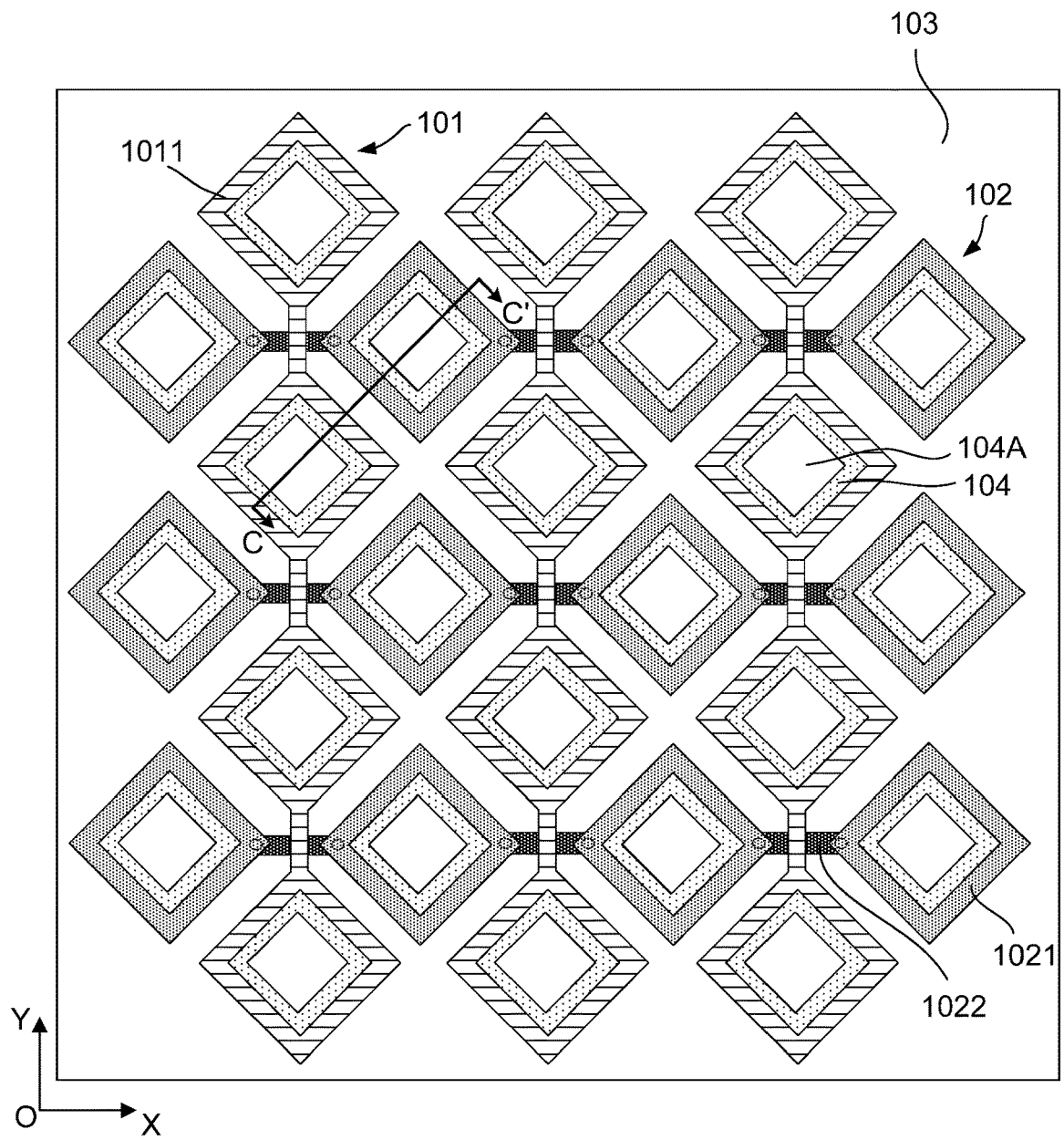
FIG. 5A is a top view of another touch structure, according to some embodiments.
Figure 5B:
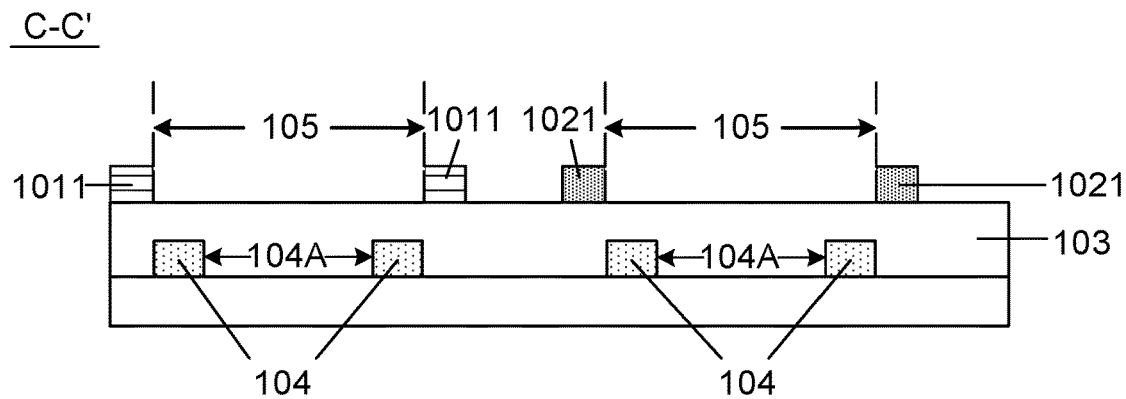
FIG. 5B is a cross-sectional view of the touch structure in FIG. 5A taken along the line C-C', according to some embodiments.
Figure 6A:
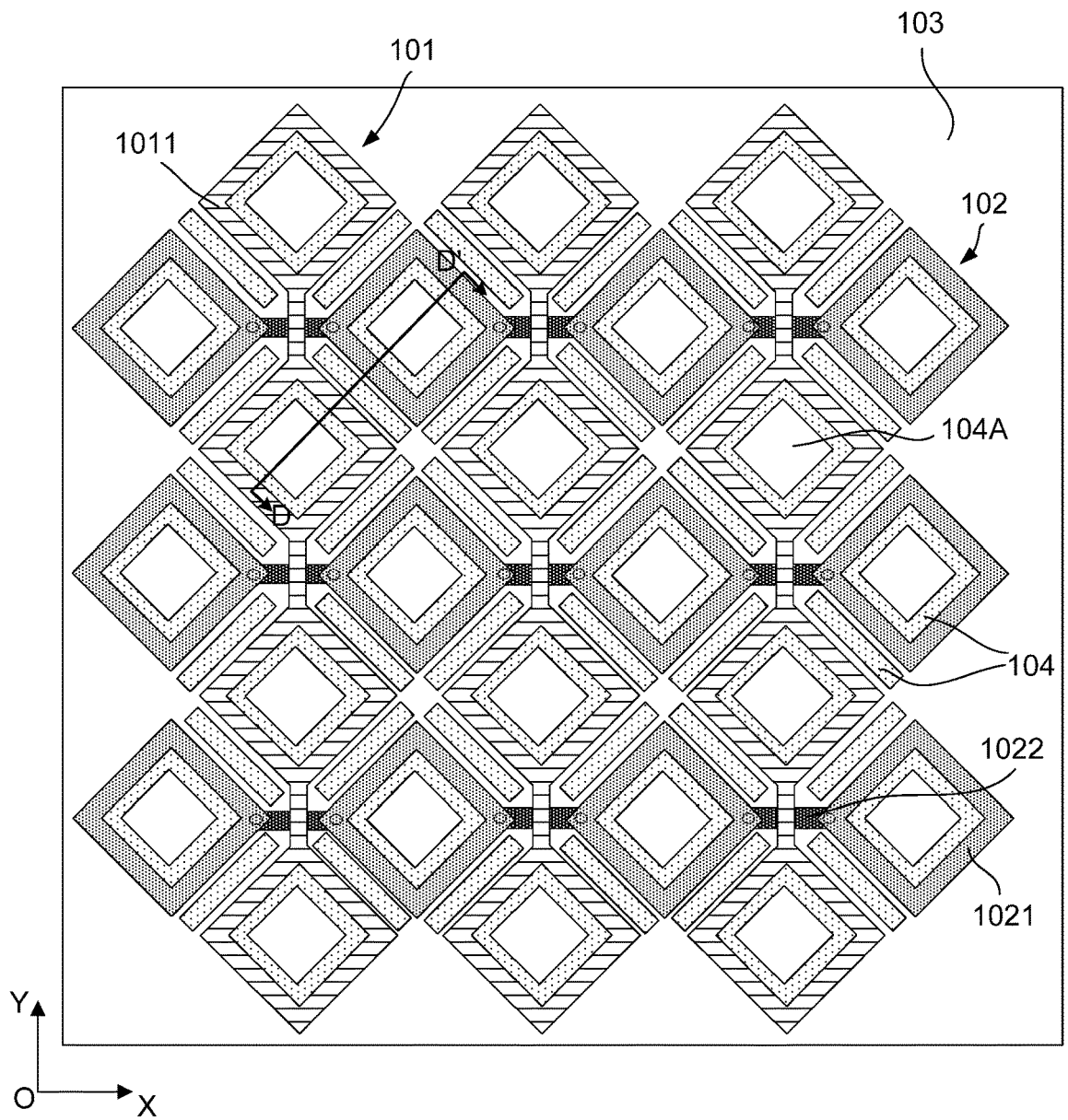
FIG. 6A is a top view of yet another touch structure, according to some embodiments.
Figure 6B:
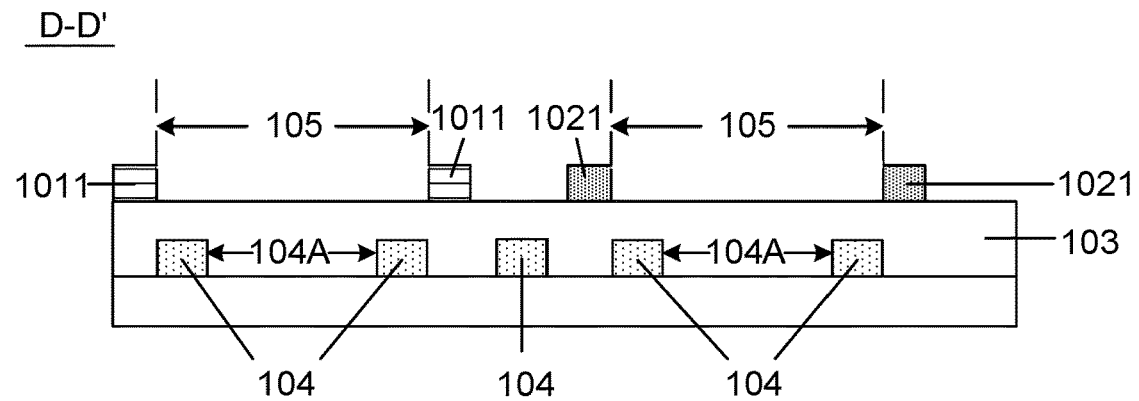
FIG. 6B is a cross-sectional view of the touch structure in FIG. 6A taken along the line D-D', according to some embodiments.

In some embodiments, as shown in FIGS. 4B, 5B and 6B, the plurality of first touch electrodes 101 and the plurality of second touch sub-electrodes 1021 are disposed in a same layer, and are made of a same material. In this way, the plurality of first touch electrodes 101 and the plurality of second touch sub-electrodes 1021 may be formed through a same patterning process (e.g., a first patterning process) with a same mask, which may simplify the process of manufacturing the touch structure 10.

It will be noted that, the first and second patterning processes, for example, include exposure, development and/or etching. The patterns of the layer formed through the patterning process may be continuous or discontinuous, and the patterns may be at different heights or have different thicknesses.

It will be noted that, if the dummy electrode 104 is not provided, a region of the touch display device where the first touch electrode 101 and the second touch electrode 102 are provided and a region of the touch display device where the first touch electrode 101 and the second touch electrode 102 are not provided have different reflectivity, which may cause the two regions to have different colors. In other words, there is a large visual contrast in the two regions, so that the first touch electrodes 101 and the second touch electrodes 102 may be recognized by a user, thereby affecting a display effect of the touch display device. Moreover, when there is bright light incident onto the touch display device, this phenomenon may be more obvious. By providing the dummy electrode 104 in the region where the first touch electrode 101 and the second touch electrode 102 are not provided, the difference of the reflectivity and the visual contrast may be reduced, and the display effect may be improved.

The positions of the plurality of dummy electrodes 104 are not limited here, as long as the plurality of dummy electrodes 104 can improve the display effect. For example, the plurality of dummy electrodes 104 are arranged according to the structure of the touch structure 10.

In some examples, as shown in FIGS. 4A and 4B, the orthographic projection of the dummy electrode 104 on the insulating layer 103 is within an area between an orthographic projection of an adjacent first touch electrode 101 on the insulating layer 103 and an orthographic projection of an adjacent second touch electrode 102 on the insulating layer 103.

In some other examples, as shown in FIGS. 4A to 6B, the first touch electrode 101 includes a plurality of first touch sub-electrodes 1011 arranged along the first direction OY and electrically connected sequentially. For example, as shown in FIGS. 5A to 6B, every two adjacent sub-electrodes 1011 are electrically connected directly. For another example, as shown in FIG. 4A, the first touch electrode 101 further includes a plurality of connecting portions 1012, and every two adjacent first touch sub-electrodes 1011 are electrically connected via a corresponding connecting portion 1012. The plurality of connecting portions 1012 and the plurality of first touch sub-electrodes 1011 may be disposed in a same layer.

In some embodiments, as shown in FIGS. 5A to 5B, at least one of the first touch sub-electrodes 1011 and the second touch sub-electrodes 1021 includes at least one first opening 105. For example, each of the first touch sub-electrodes 1011 and the second touch sub-electrodes 1021 includes one first opening 105.

An orthographic projection of the dummy electrode 104 on the insulating layer 103 is within an orthographic projection of a corresponding first opening 105 on the insulating layer 103.

In a case where the touch structure 10 is disposed on a light exit surface of the display panel (for example, the liquid crystal display panel 1 shown in FIG. 1A, the electroluminescent display panel 3 shown in FIGS. 2A and 2B, or the photoluminescent display panel 9 shown in FIG. 2C), a light-emitting region of a sub-pixel may corresponds to a first opening 105 of the touch structure 10. In this way, the blocking of the light emitted from the display panel by the touch structure 10 may be reduced, and thus the light transmittance of the touch display device may be improved.

For example, the shape of the first opening 105 is a regular shape such as a circle, an ellipse, a triangle, or a quadrilateral. Or, the shape of the first opening 105 may be an irregular shape.

In some embodiments, a border of the orthographic projection of the dummy electrode 104 on the insulating layer 103 coincides with a border of the orthographic projection of the corresponding first opening 105 on the insulating layer 103.

In some embodiments, as shown in FIGS. 6A to 6B, the dummy electrodes 104 include: dummy electrodes 104, an orthographic projection of each of which on the insulating layer 103 is within an orthographic projection of a corresponding first opening 105 on the insulating layer 103; and dummy electrodes 104, an orthographic projection of each of which on the insulating layer 103 is within the area between the orthographic projection of the adjacent first touch electrode 101 on the insulating layer 103 and the orthographic projection of the adjacent second touch electrode 102 on the insulating layer 103.

In some embodiments, as shown in FIGS. 5A to 6B, each of at least some of the dummy electrodes 104 includes a second opening 104A, and the second opening 104A is in the middle of the dummy electrode 104. For example, each dummy electrode 104 includes a second opening 104A, and the second opening 104A is located in the middle of the dummy electrode 104.

The shape of the second opening 104A may be any regular shape, such as a circle, an ellipse, a triangle, or a quadrilateral. Or, the shape of the second opening 104A may be an irregular shape.

In this way, it is also possible that the blocking of the light emitted from the display panel by the dummy structure 10 is reduced, so that the light transmittance of the display device may be improved.

It will be noted that, the touch structure shown in FIGS. 5A to 6B are described by an example in which each first touch sub-electrode 1011 and each second touch sub-electrode 1021 includes one first opening 105, and both the first opening 105 and the second opening 104A are in a shape of a quadrilateral. However, the number of the first openings 105 and the shapes of the first opening 105 and the second opening 104A are not limited thereto, and may be designed according to actual needs.

In some embodiments, the materials of the plurality of first touch electrodes 101, the plurality of second touch electrodes 102, and the plurality of dummy electrodes 104 are transparent, and include at least one of metal oxides, metal, conductive inorganic substances, or conductive organic substances.

The metal may include a metal element, an alloy, a metal nanowire, or the like. For example, the metal element is silver (Ag), copper (Cu) or aluminum (Al). For example, the alloy is aluminum-niobium (AlNb) alloy.

The metal oxides may include indium tin oxide (ITO), indium zinc oxide (IZO), or indium tin zinc oxide (ITZO).

In some embodiments, the materials of the plurality of dummy electrodes 104, the plurality of first touch electrodes 101 and the plurality of second touch electrodes 102 are a same material. In this way, there is no visual contrast among the plurality of dummy electrodes 104, the plurality of first touch electrodes 101 and the plurality of second touch electrodes 102, so that the first touch electrodes 101 and second touch electrodes 102 may be hardly to be recognized. Accordingly, the touch display device including the touch structure 10 may have a good display effect.

In some embodiments, at least one of the plurality of first touch sub-electrodes 1011 and the plurality of second touch sub-electrodes 1021 has a grid structure. For example, each first touch sub-electrode 1011 and each second touch sub-electrode 1021 has the grid structure.

Figure 7:
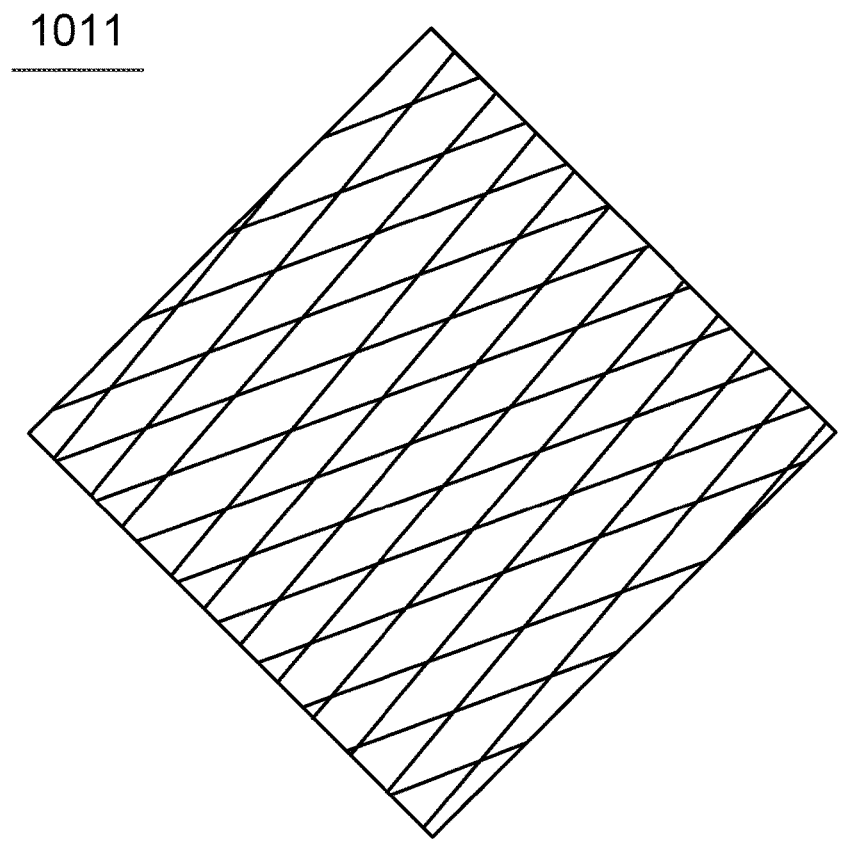
FIG. 7 is a top view of a portion of a first touch sub-electrode, according to some embodiments.

Each gird of the grid structure may be in a shape of a regular polygon or an irregular polygon. As shown in FIG. 7, taking the first touch sub-electrode 1011 as an example, a plurality of metal wires intersect to form a plurality of grids, and each grid is in a shape of a diamond. Of course, the grid may also be in a shape of a rectangle, a parallelogram or a regular hexagon.

In some embodiments, materials of the grid structures of the first touch electrodes 101 and the second touch sub-electrodes 1021 are metal elements or alloys.

The grid structures made of metal elements or alloys have good bending resistance. Therefore, in a case where the touch structure 10 is applied to a flexible touch display device, the bending resistance and reliability of the touch display device may be improved.

It will be noted that the touch display device having the touch structure 10 may realize multi-touch.

Since the grid structures made of metal elements or alloys can allow light to pass through, and its square resistance is low, a delay of signal transmission in the touch structure 10 may be reduced. In a case where the touch structure 10 is applied to a large-size touch display device, the touch structure 10 may reduce response time of the touch display device, which means a good touch effect. In addition, since metal elements or alloys have small resistivity, the first touch electrode 101 and the second touch electrode 102 may have good conductivity, thereby preventing charges on the first touch electrode 101 or the second touch electrode 102 from accumulating locally, and an electrostatic discharge (ESD) phenomenon may be avoided.

In some examples, the square resistance of the metal elements or the alloys is less than or equal to 0.3 $\Omega/cm^2$.

It will be understood that, for manufacturing a touch display device with a certain size, before forming the first touch electrode 101 and the second touch electrode 102 having the grid structures, a relevant software may be used to perform an optical simulation. In this way, parameters of the grids of the first touch sub-electrode 1011 and the second touch sub-electrode 1021 may match the touch display panel. For example, for diamond-shaped grids, lengths and included angles may be determined through the optical simulation, which may reduce occurrence of moire on the touch display panel, and improve the display effect.

Figure 8:
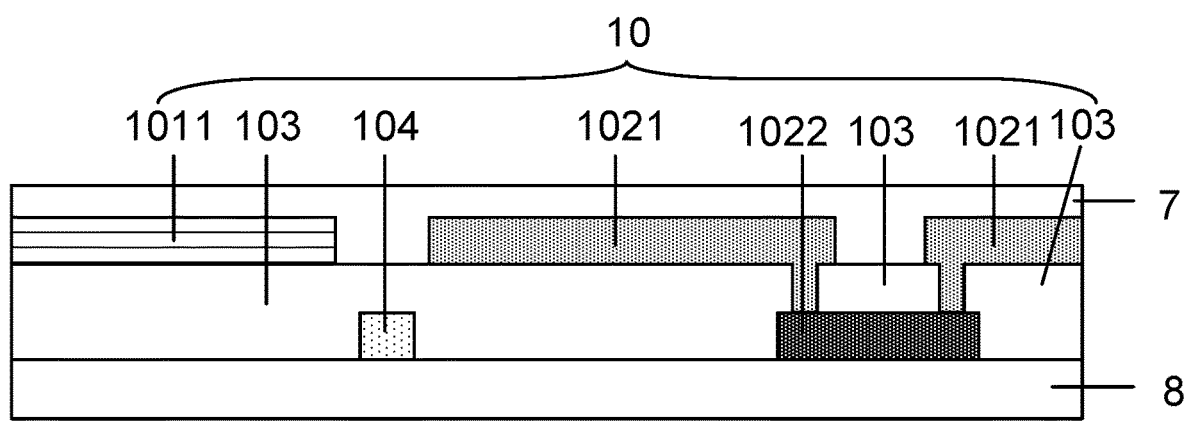
FIG. 8 is a cross-sectional view of a touch substrate, according to some embodiments.

In some embodiments, as shown in FIG. 8, the touch structure 10 is included in a touch substrate. The touch substrate further includes a base 8, and the touch structure 10 is disposed on the base 8. For the touch structure 10, reference may be made to the above description, and details will not be elaborated here again.

The touch substrate may be attached to the display panel. In this way, the touch substrate and the display panel can be separately manufactured.

The touch substrate has the same beneficial effects as the touch substrate 10, and details will not be elaborated here again.

In some embodiments, as show in FIG. 8, the touch substrate further includes a protective layer 7 disposed on a surface of the touch structure 10 facing away from the base 8.

A material of the protective layer 7 includes at least one of a silicon oxide, a silicon nitride or a silicon oxynitride. The protective layer 7 can protect the touch structure 10, and enable an upper surface of the touch structure 10 to be planar, which may convenient for forming layers on the touch structure 10 in subsequent processes.

Figure 9:
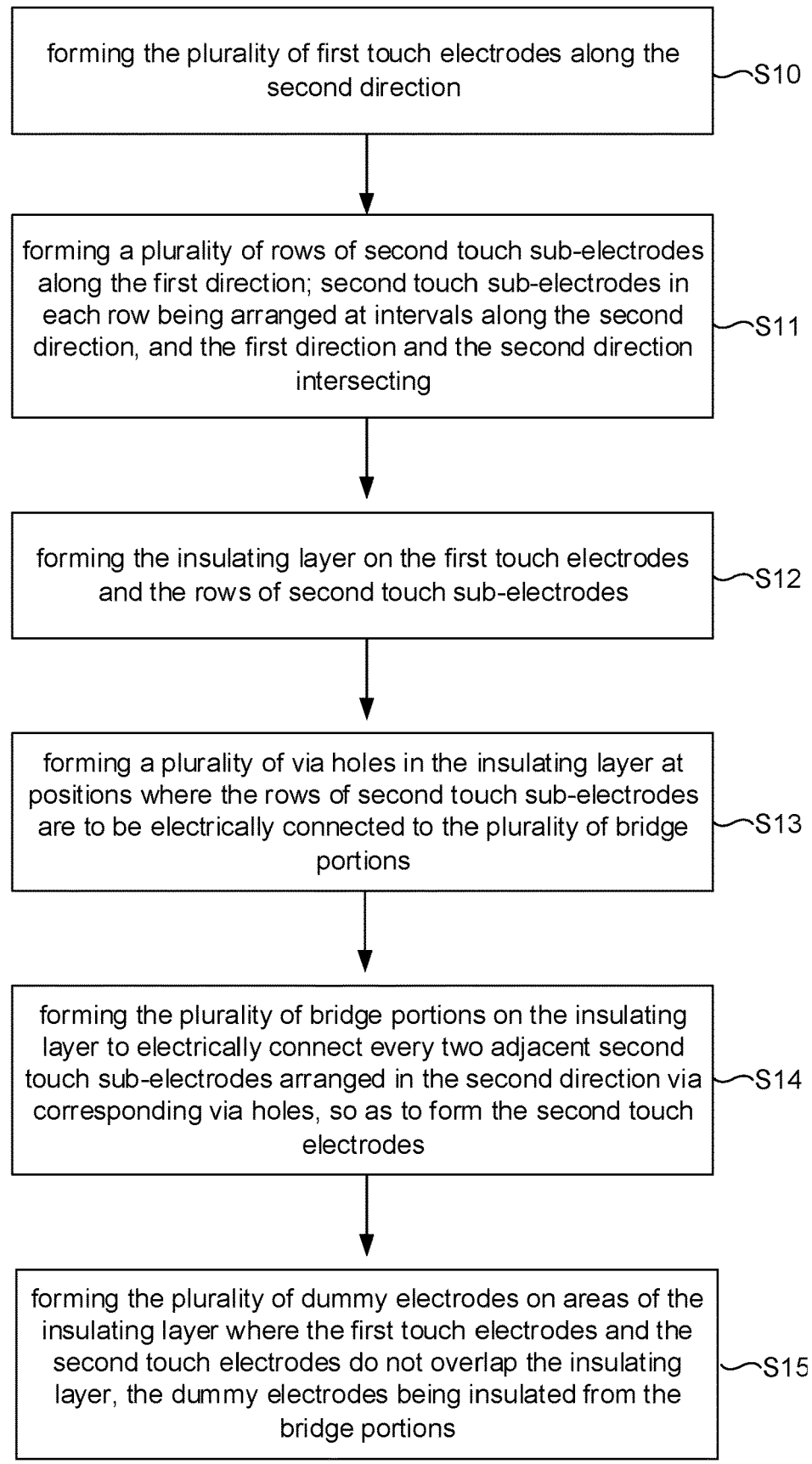
FIG. 9 is a flow diagram of a method for manufacturing a touch structure, according to some embodiments.

As shown in FIG. 9, some embodiments of the present disclosure provide a method for manufacturing the touch structure 10, and the method includes the following S10 to S15.

Figure 10A:
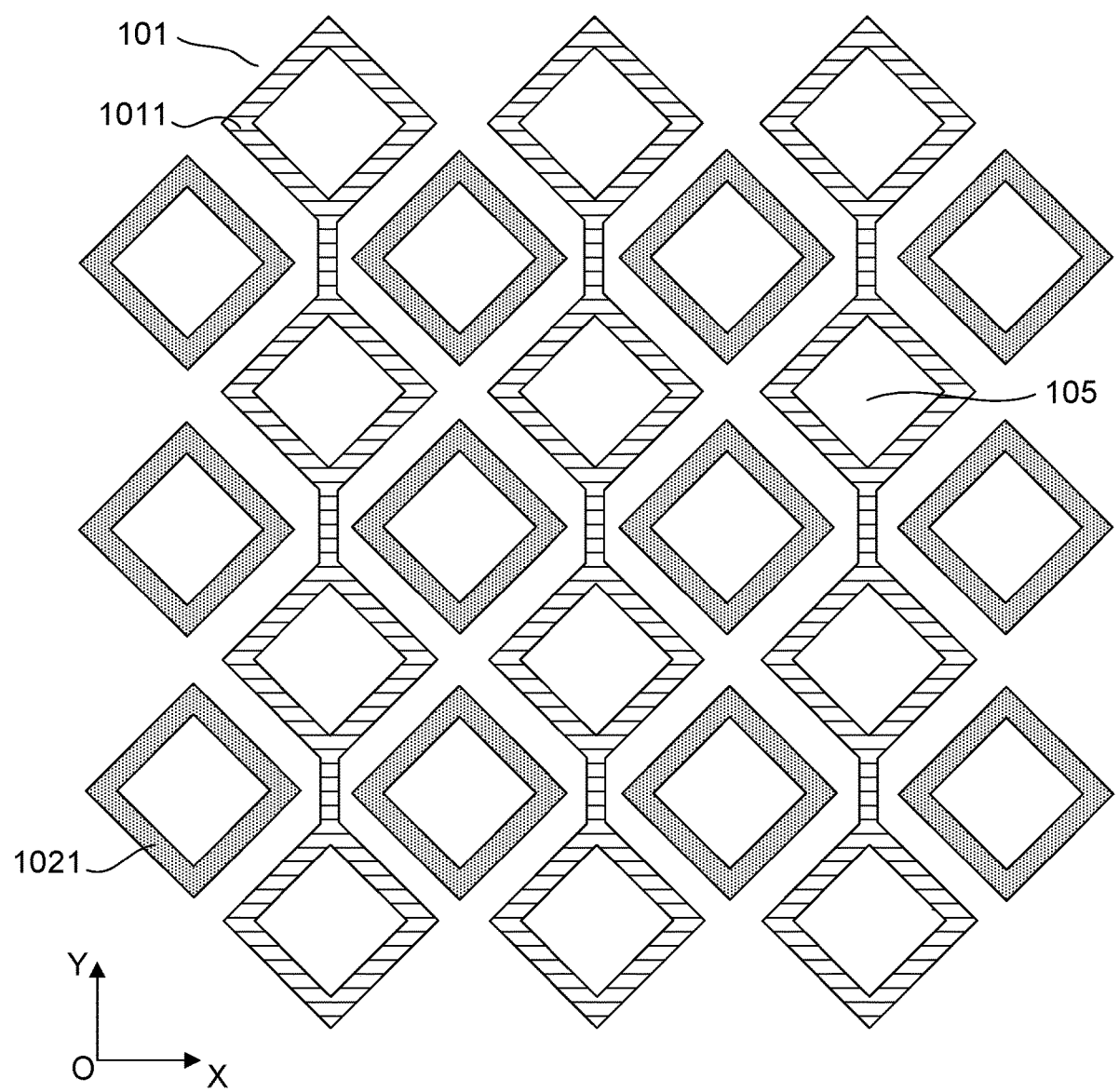
FIGS. 10A to 10C are schematic diagrams showing a process of manufacturing a touch structure, according to some embodiments.

In S10, as shown in FIG. 10A, the plurality of first touch electrodes 101 are formed along the second direction OX.

In S11, as shown in FIG. 10A, the plurality of rows of second touch sub-electrodes 1021 are formed along the first direction OY. Second touch sub-electrodes in each row is arranged at intervals along the second direction OX, and the first direction OY and the second direction OX intersect. For example, the first direction OY and the second direction OX are substantially perpendicular.

It will be noted that, the sequence of S10 and S11 is not limited herein. For example, S10 is first performed and then S11 is performed. For another example, S11 is first performed and then S10 is performed. For yet another example, S10 and S11 are performed simultaneously. In this case, the plurality of first touch electrodes 101 and the plurality of rows of second touch sub-electrodes 1021 are formed through a first patterning process. In this way, the process of manufacturing the touch structure 10 may be simplified and the cost may be decreased.

Figure 10B:
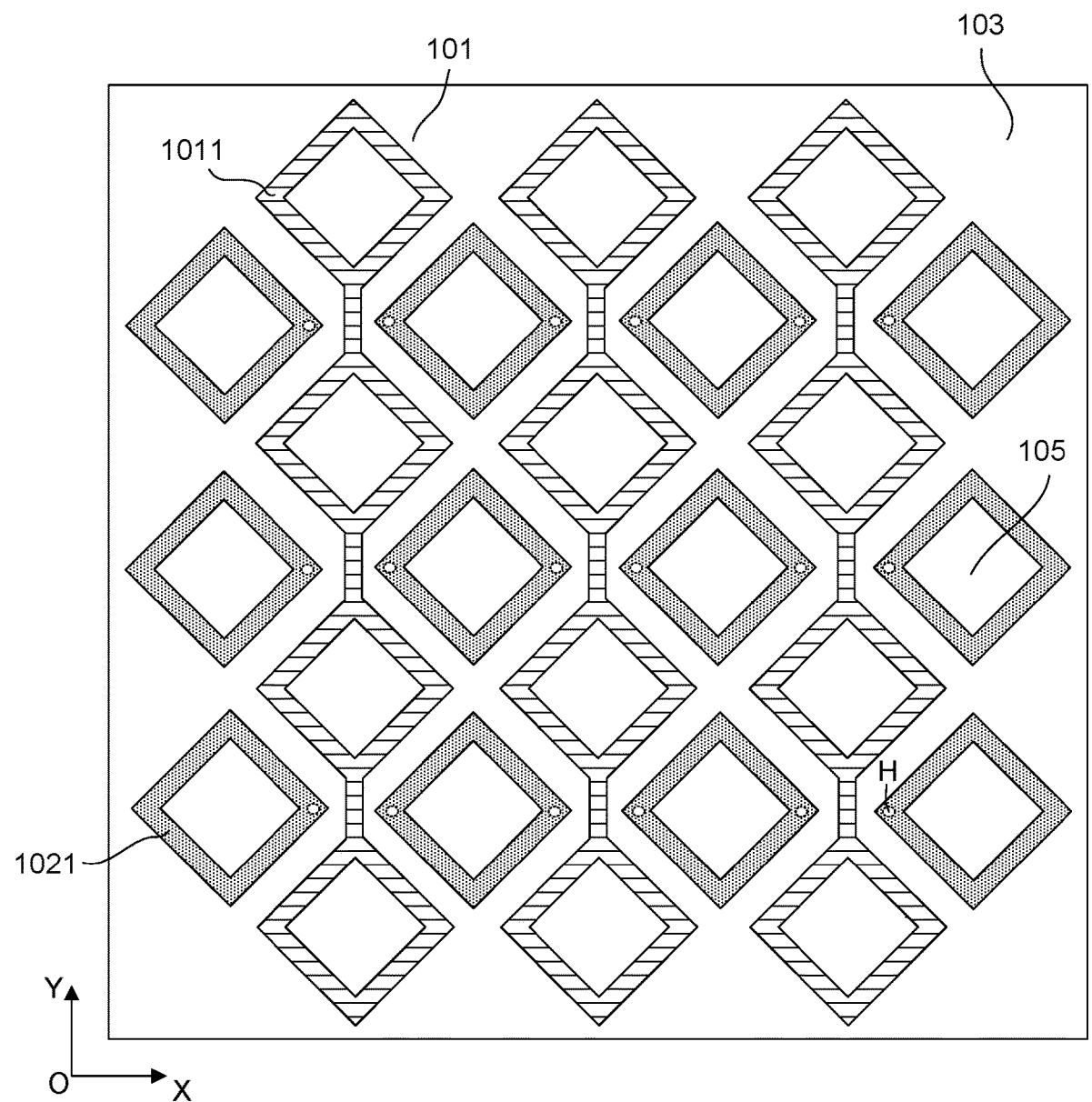

In S12, as shown in FIG. 10B, the insulating layer 103 is formed on the plurality of first touch electrodes 101 and the plurality of rows of second touch sub-electrodes 1021.

In S13, as shown in FIG. 10B, a plurality of via holes H are formed in the insulating layer 103 at positions where the rows of second touch sub-electrodes 1021 are to be electrically connected to the plurality of bridge portions 1022

For example, at least one of a silicon oxide layer, a silicon nitride layer or a silicon oxynitride layer, which serves as the insulating layer 103, is formed on the plurality of first touch electrodes 101 and the plurality of rows of second touch sub-electrodes 1021 through a chemical vapor deposition process. Then, a fifth patterning process is applied to form the plurality of via holes H in the insulating layer 103.

Figure 10C:
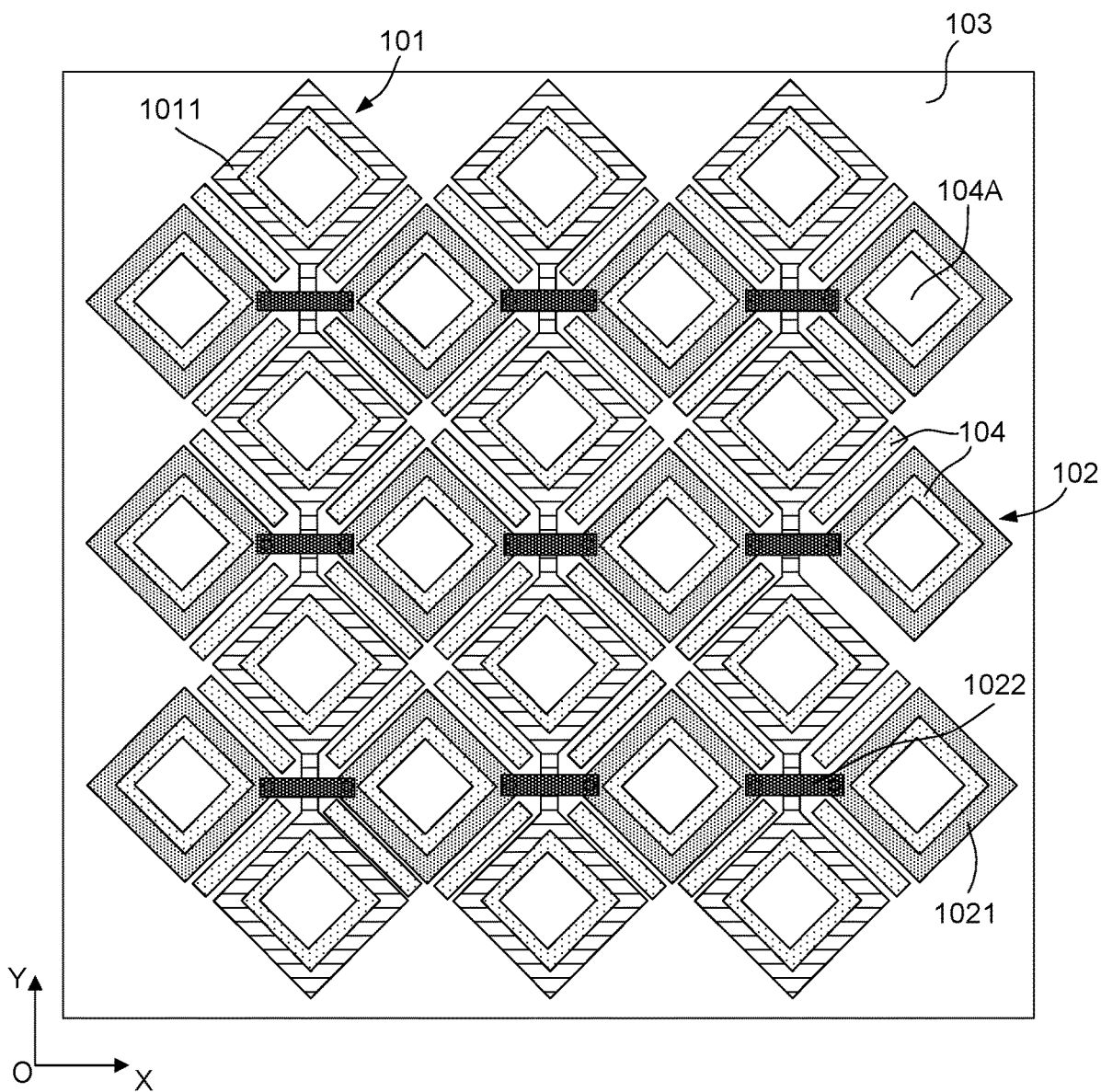

In S14, as shown in FIG. 10C, the plurality of bridge portions 1022 are formed on the insulating layer 103 to electrically connect any two adjacent second touch sub-electrodes 1021 in each row of the second touch sub-electrodes 1021 via the plurality of via holes H, so as to form the plurality of second touch electrodes 102.

In S15, as shown in FIG. 10C, the plurality of dummy electrodes 104 are formed on areas of the insulating layer 103 where the plurality of first touch electrodes 101 and the plurality of second touch electrodes 102 do not overlap the insulating layer 103, and the plurality of dummy electrodes 104 are insulated from the bridge portions 1022.

It will be noted that, the plurality of bridge portions 1022 and the plurality of dummy electrodes 104 may be formed through a second patterning process. In this way, the process of manufacturing the touch structure 10 may be simplified and the cost may be decreased.

The above method has the same beneficial effects as the touch substrate 10, and details will not be elaborated here again.

Figure 11:
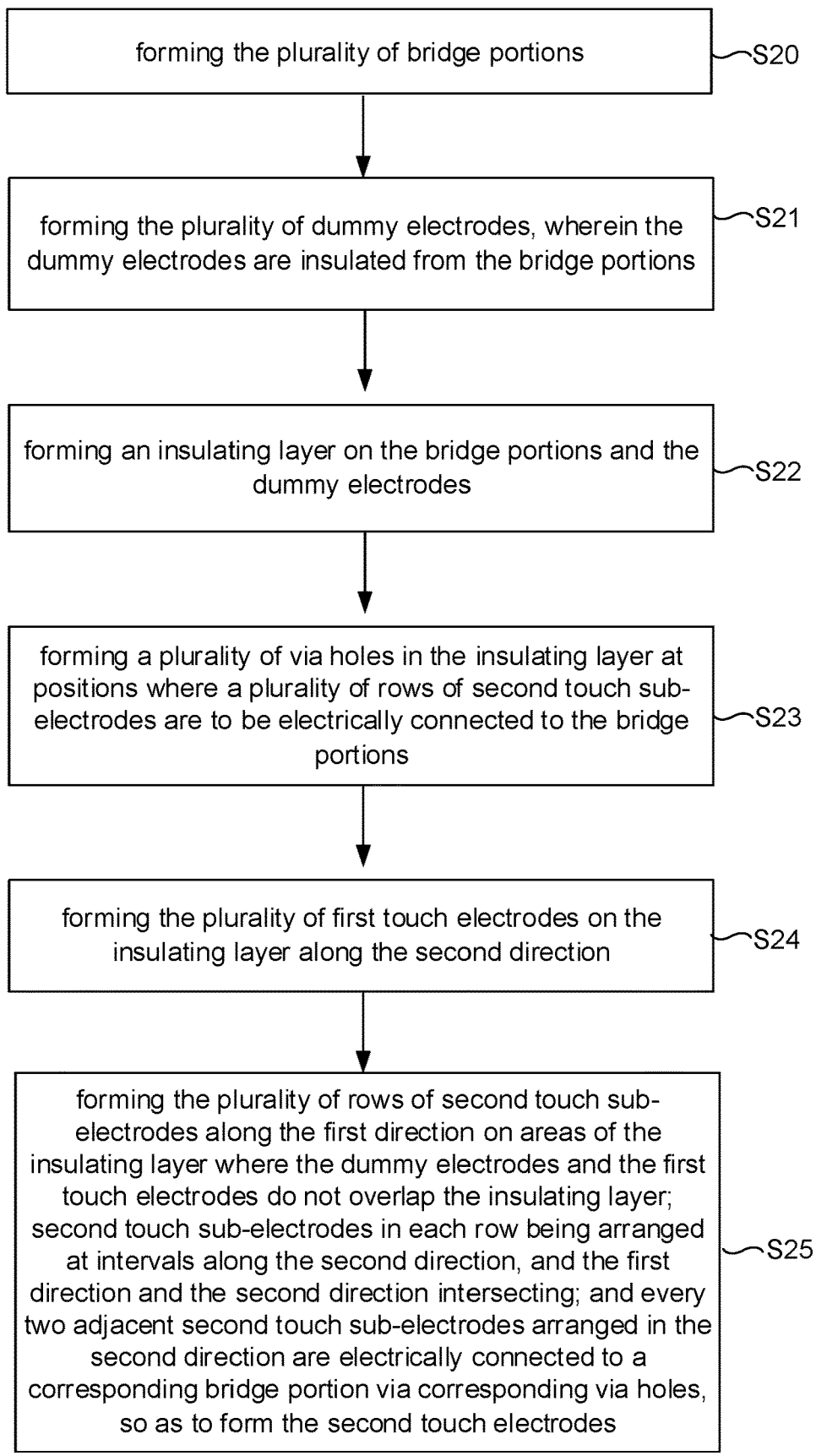
FIG. 11 is a flow diagram of a method for manufacturing another touch structure, according to some embodiments.

As shown in FIG. 11, some embodiments of the present disclosure provide another method for manufacturing the touch structure 10, and the method includes the following S20 to S25.

Figure 12A:
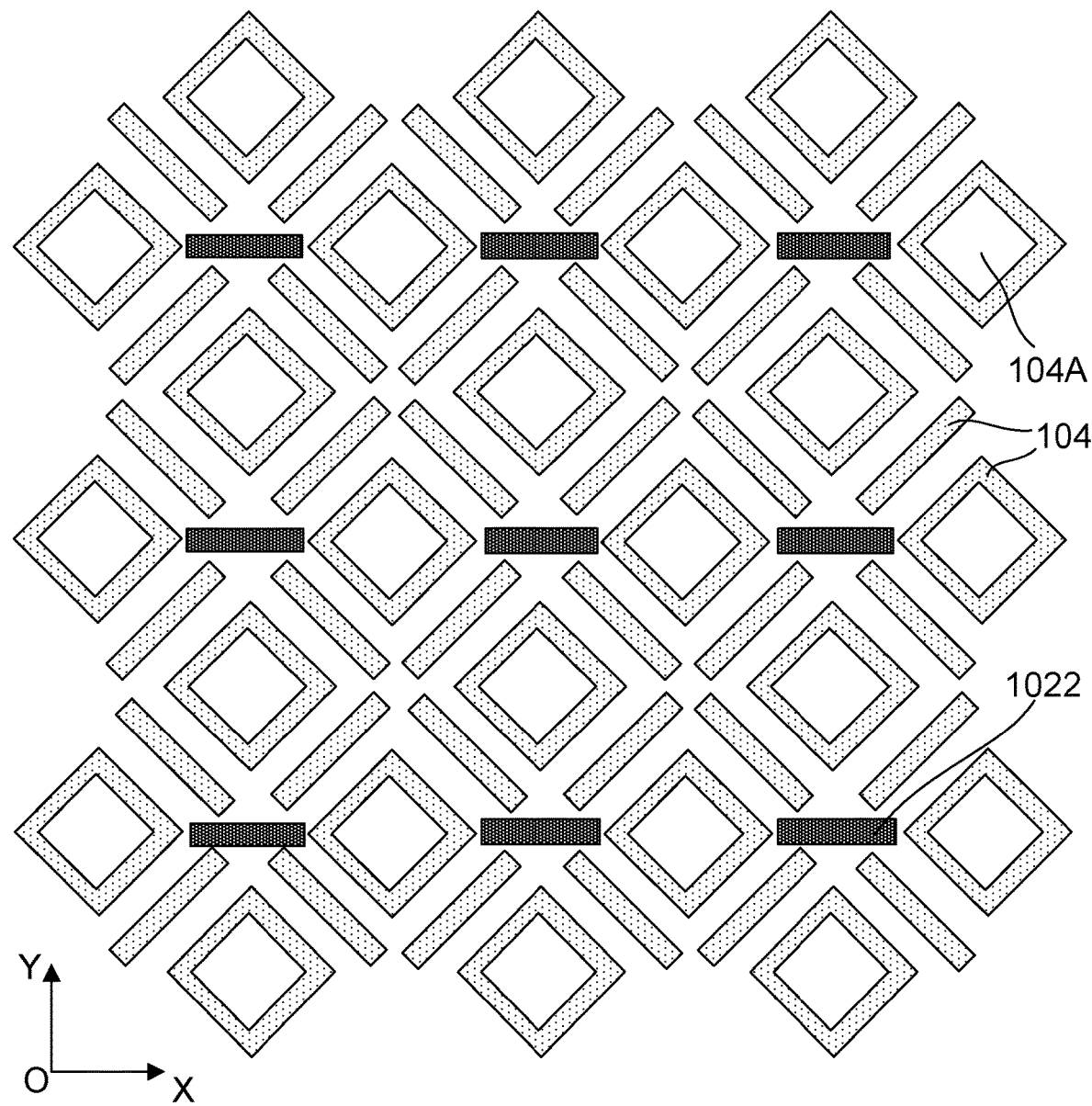
FIGS. 12A to 12C are schematic diagrams showing a process of manufacturing another touch structure, according to some embodiments.

In S20, as shown in FIG. 12A, the plurality of bridge portions 1022 are formed.

In S21, the plurality of dummy electrodes 104 are formed. The plurality of dummy electrodes 104 are insulated from the plurality of bridge portions 1022.

It will be noted that, the plurality of bridge portions 1022 and the plurality of dummy electrodes 104 may be formed through a fourth patterning process. In this way, the process of manufacturing the touch structure 10 may be simplified and the cost may be decreased.

Figure 12B:
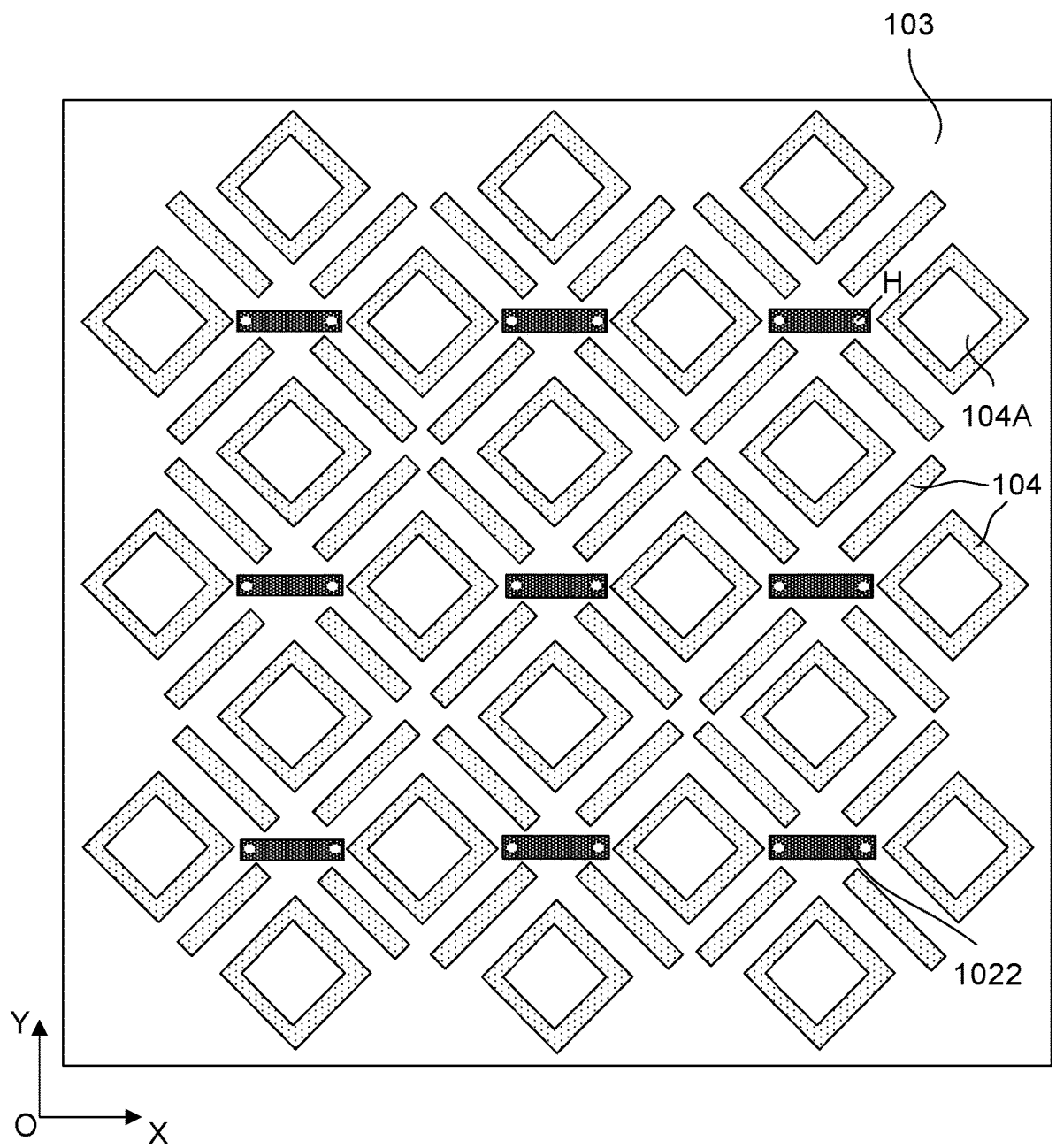

In S22, as shown in FIG. 12B, the insulating layer 103 is formed on the plurality of bridge portions 1022 and the plurality of dummy electrodes 104.

In S23, as shown in FIG. 12B, a plurality of via holes H are formed in the insulating layer 103 at positions where the rows of second touch sub-electrodes 1021 are to be electrically connected to the plurality of bridge portions 1022.

Figure 12C:
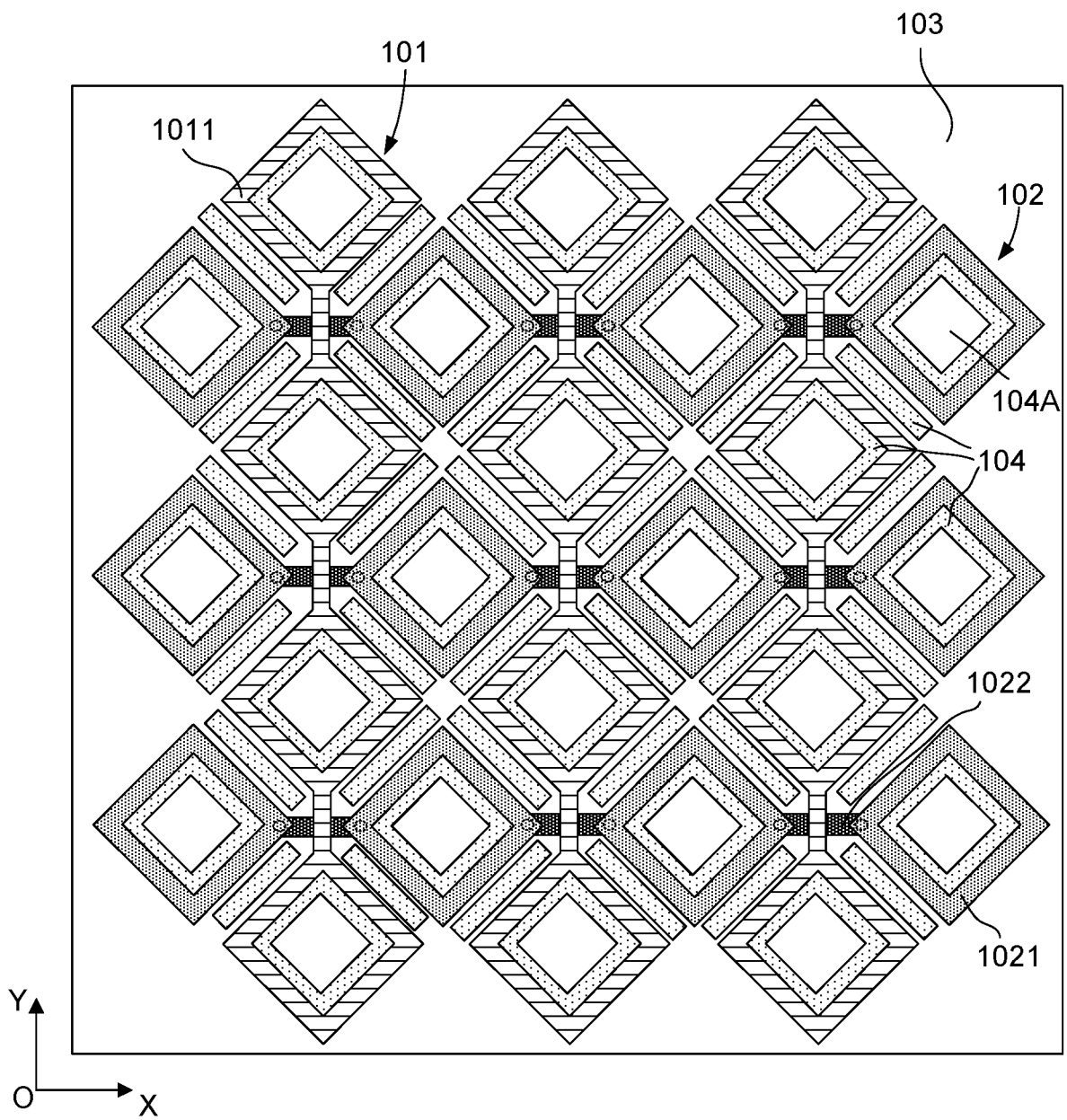

In S24, as shown in FIG. 12C, the plurality of first touch electrodes 101 are formed on the insulating layer 103 along the second direction OX.

In S25, the plurality of rows of second touch sub-electrodes 1021 are formed along the first direction OY on areas of the insulating layer 103 where the dummy electrodes 104 and the first touch electrodes 101 do not overlap the insulating layer 103. Second touch sub-electrodes in each row are arranged at intervals along the second direction OX, and the first direction OY and the second direction OX intersect. For example, the first direction OY and the second direction OX are substantially perpendicular. Every two adjacent second touch sub-electrodes 1021 in each row of second touch sub-electrodes 1021 are electrically connected to the corresponding bridge portion 1022 via corresponding via holes H, so as to form the plurality of second touch electrodes 102.

It will be noted that, the sequence of S24 and S25 is not limited herein. For example, S24 is first performed and then S25 is performed. For another example, S25 is first performed and then S24 is performed. For yet another example, S24 and S25 are performed simultaneously. In this case, the plurality of first touch electrodes 101 and the plurality of rows of second touch sub-electrodes 1021 may be formed through a third patterning process. In this way, the process of manufacturing the touch structure 10 may be simplified and the cost may be decreased.

Each of the patterning processes described above may include: coating photoresist; exposing the coated photoresist; developing the exposed photoresist; etching and removing photoresist.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A touch structure, comprising:
    a plurality of first touch electrodes arranged in a second direction, each first touch electrode extending along a first direction, the first direction and the second direction intersecting, wherein at least one first touch electrode of the plurality of first touch electrodes includes:
        a plurality of first touch sub-electrodes arranged in the first direction and electrically connected sequentially;
    a plurality of second touch electrodes arranged in the first direction, each second touch electrode extending along the second direction, wherein at least one second touch electrode of the plurality of second touch electrodes includes:
        a plurality of second touch sub-electrodes arranged at intervals in the second direction; and
        a plurality of bridge portions, wherein every two adjacent second touch sub-electrodes are electrically connected via a corresponding bridge portion;
    an insulating layer, wherein along a thickness direction of the insulating layer, the plurality of second touch sub-electrodes and the bridge portions are disposed on two sides of the insulating layer, respectively, and the plurality of second touch sub-electrodes and the first touch electrodes are disposed on a same side of the insulating layer; and
    a plurality of dummy electrodes, wherein the dummy electrodes, the second touch electrodes and the first touch electrodes are insulated from each other, the dummy electrodes and the bridge portions are disposed on a same side of the insulating layer; and orthographic projections of the dummy electrodes on the insulating layer do not overlap with orthographic projections of the first touch electrodes and the second touch electrodes on the insulating layer; wherein
    at least one of the first touch sub-electrodes and the plurality of second touch sub-electrodes includes at least one first opening; and
    an orthographic projection of a dummy electrode in the dummy electrodes on the insulating layer is within an orthographic projection of a corresponding first opening on the insulating layer.

2. The touch structure according to claim 1, wherein the dummy electrodes and the bridge portions are disposed in a same layer, and are made of a same material.

3. The touch structure according to claim 2, wherein the first touch electrodes and the plurality of second touch sub-electrodes are disposed in a same layer, and are made of a same material.

4. The touch structure according to claim 1, wherein an orthographic projection of a dummy electrode in the dummy electrodes on the insulating layer is within an area between an orthographic projection of an adjacent one of the first touch electrodes on the insulating layer and an orthographic projection of an adjacent one of the second touch electrodes on the insulating layer.

5. The touch structure according to claim 1, wherein a border of the orthographic projection of the dummy electrode on the insulating layer coincides with a border of the orthographic projection of the corresponding first opening on the insulating layer.

6. The touch structure according to claim 1, wherein the dummy electrode includes a second opening in the middle of the dummy electrode.

7. The touch structure according to claim 1, wherein materials of the first touch electrodes, the second touch electrodes and the dummy electrodes are transparent, and include at least one of metal oxides, metal, conductive inorganic substances, or conductive organic substances.

8. The touch structure according to claim 7, wherein materials of the dummy electrodes, the first touch electrodes and the second touch electrodes are the same.

9. A touch substrate, comprising:
a base; and
the touch structure according to claim 1, wherein the touch structure is disposed on the base.

10. The touch substrate according to claim 9, further comprising a protective layer disposed on a side of the touch structure away from the base, wherein
a material of the protective layer includes at least one of a silicon oxide, a silicon nitride or a silicon oxynitride.

11. A touch display device, comprising:
a display panel; and
the touch structure according to claim 1.

12. The touch display device according to claim 11, wherein the display panel includes a plurality of sub-pixels, and each sub-pixel has at least one light-emitting region;
an orthographic projection of a light-emitting region on the insulating layer is within an orthographic projection of a corresponding first opening on the insulating layer.

13. The touch display device according to claim 12, wherein the dummy electrode includes a second opening located in the middle of the dummy electrode; and
an orthographic projection of the light-emitting region on the insulating layer is within an orthographic projection of a corresponding second opening on the insulating layer.

14. A method for manufacturing the touch structure according to claim 1, the method comprising:
forming the plurality of first touch electrodes along the second direction;
forming a plurality of rows of second touch sub-electrodes along the first direction; second touch sub-electrodes in each row being arranged at intervals along the second direction, and the first direction and the second direction intersecting;
forming the insulating layer on the first touch electrodes and the rows of second touch sub-electrodes;
forming a plurality of via holes in the insulating layer at positions where the rows of second touch sub-electrodes are to be electrically connected to the plurality of bridge portions;
forming the plurality of bridge portions on the insulating layer to electrically connect every two adjacent second touch sub-electrodes arranged in the second direction via corresponding via holes, so as to form the second touch electrodes;
forming the plurality of dummy electrodes on areas of the insulating layer where the first touch electrodes and the second touch electrodes do not overlap the insulating layer, the dummy electrodes being insulated from the bridge portions; wherein at least one first touch electrode includes a plurality of first touch sub-electrodes arranged in the first direction and electrically connected sequentially; at least one of the first touch sub-electrodes and the plurality of second touch sub-electrodes includes at least one first opening; and
an orthographic projection of a dummy electrode in the dummy electrodes on the insulating layer is within an orthographic projection of a corresponding first opening on the insulating layer.

15. The method according to claim 14, wherein
the first touch electrodes and the rows of second touch sub-electrodes are formed through a first patterning process; and
the bridge portions and the dummy electrodes are formed through a second patterning process.

16. A method for manufacturing the touch structure according to claim 1, the method comprising:
forming the plurality of bridge portions;
forming the plurality of dummy electrodes, wherein the dummy electrodes are insulated from the bridge portions;
forming an insulating layer on the bridge portions and the dummy electrodes;
forming a plurality of via holes in the insulating layer at positions where a plurality of rows of second touch sub-electrodes are to be electrically connected to the bridge portions;
forming the plurality of first touch electrodes on the insulating layer along the second direction; and
forming the plurality of rows of second touch sub-electrodes along the first direction on areas of the insulating layer where the dummy electrodes and the first touch electrodes do not overlap the insulating layer; second touch sub-electrodes in each row being arranged at intervals along the second direction, and the first direction and the second direction intersecting; and every two adjacent second touch sub-electrodes arranged in the second direction are electrically connected to a corresponding bridge portion via corresponding via holes, so as to form the second touch electrodes; wherein
at least one first touch electrode includes a plurality of first touch sub-electrodes arranged in the first direction and electrically connected sequentially; at least one of the first touch sub-electrodes and the plurality of second touch sub-electrodes includes at least one first opening; and
an orthographic projection of a dummy electrode in the dummy electrodes on the insulating layer is within an orthographic projection of a corresponding first opening on the insulating layer.

17. The method according to claim 16, wherein
the first touch electrodes and the rows of second touch sub-electrodes are formed through a third patterning process; and
the bridge portions and the dummy electrodes are formed through a fourth patterning process.

* * * * *